US006189728B1

United States Patent
Yuyama et al.

(10) Patent No.: US 6,189,728 B1
(45) Date of Patent: Feb. 20, 2001

(54) AMPULE FEEDER

(75) Inventors: Shoji Yuyama; Kunihiko Kano; Yasuhiro Shigeyama; Tsuyoshi Kodama; Shinya Yasuda, all of Toyonaka (JP)

(73) Assignee: Kabushiki Kaisha Yuyama Seisakusho, Osaka (JP)

( * ) Notice: Under 35 U.S.C. 154(b), the term of this patent shall be extended for 0 days.

(21) Appl. No.: 09/126,842

(22) Filed: Jul. 31, 1998

(30) Foreign Application Priority Data

| Aug. 6, 1997 | (JP) | 9-212102 |
| Apr. 10, 1998 | (JP) | 10-099001 |
| May 29, 1998 | (JP) | 10-149489 |

(51) Int. Cl.[7] .................................................. B65H 7/00
(52) U.S. Cl. ............................................. 221/17; 221/192
(58) Field of Search ................................... 221/191, 192, 221/171, 254, 6, 7, 9, 17, 18, 13, 14

(56) References Cited

FOREIGN PATENT DOCUMENTS

| 405120539 | * 5/1993 | (JP) | ................................... 221/192 |
| 7-300237 | 11/1995 | (JP) . | |
| 8-225140 | 9/1996 | (JP) . | |
| 8-230826 | 9/1996 | (JP) . | |

* cited by examiner

Primary Examiner—Kenneth W. Noland
(74) Attorney, Agent, or Firm—Wenderoth, Lind & Ponack, L.L.P.

(57) ABSTRACT

An ampule feeder which can store a necessary number of ampules at the outlet so that ampules can be instantly discharged one by one in response to a discharge signal from the ampule feeder in which are randomly stored many ampules. The ampule feeder has a detachably mounted ampule container having a bottom plate inclinable in one direction. Ampules raised by an ampule receiver are fed by an endless belt of a dispenser and a predetermined number of them are stored in grooves formed in a rotor of a discharge means provided at the outlet. In response to a discharge signal, a necessary number of ampules are discharged.

11 Claims, 21 Drawing Sheets

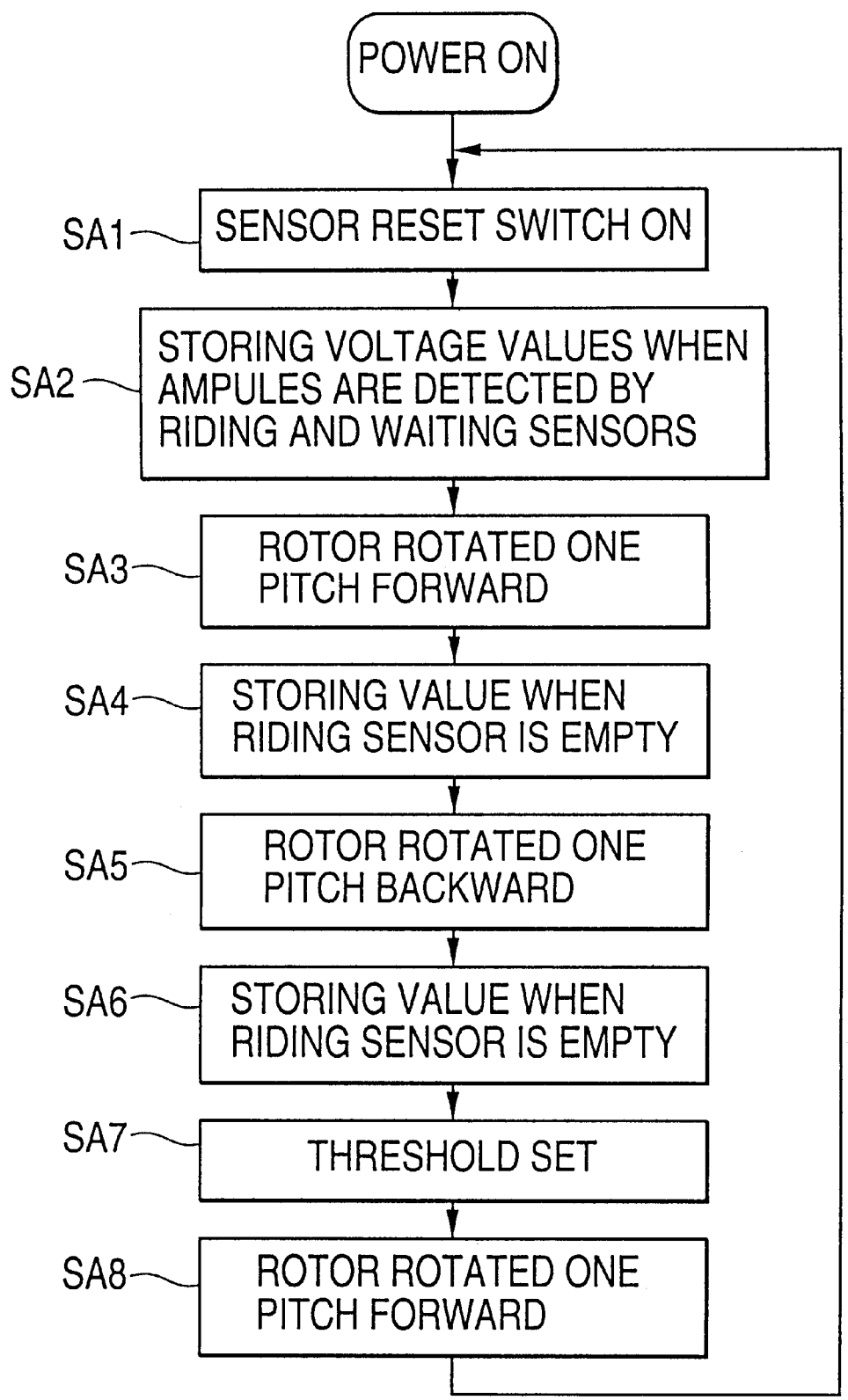

AMPULE FEEDER

BACKGROUND OF THE INVENTION

This invention relates to an ampule feeder for feeding, per prescriptions, injection drug ampules or vials stored randomly in a container.

Ampule feeders of this type are disclosed in unexamined Japanese patent publications 7-300237, 8-230826 and 8-225140.

The feeder or article storage device disclosed in the first publication has a head having a recessed top surface formed with grooves and retracted under the bottom of a container that accommodates ampules randomly. The head is pushed up by a cylinder rod to receive some ampules on the top surface and raise them. The ampules thus raised are attracted to a sucker and moved onto a conveyor.

The feeder of the second publication has a container in which ampules are stored randomly and having a movable partitioning plate partitioning the interior of the container into two variable-volume chambers. A pushrod having an ampule-receiving member on top is provided in each chamber. By pushing each ampule-receiving member to a level where its inclined top smoothly connects with a feed line, ampules thereon are discharged into the feed line.

The feeder or ampule dispenser of the third publication has an ampule storage container having an inclined bottom formed with a hole through which a pusher is moved up and down. By pushing up the pusher, one ampule is raised. When the pusher is raised to a level where its inclined top is aligned with a second inclined bottom plate, the ampule on the pusher rolls down onto the second bottom plate. The ampule on the second bottom plate is then pushed up by a second pusher to a new height. Ampules are thus taken out one by one safely without getting broken.

Today's ampule feeders are mostly of this type, i.e. the type which can randomly store ampules, because these feeders require no orderly arrangement of ampules.

In such a random storage arrangement, ampules are taken out, raised and dispensed before one or more than one ampule is taken out, arranged and fed. Thus, necessary ampules are dispensed not immediately upon request but only after a certain time has passed.

One way to cope with this problem would be to connect a discharge means which can store a plurality of ampules beforehand and dispense them one by one to a discharge port of the feeder so that ampules can be dispensed immediately when an ampule dispensing signal is received. Such a discharge means has to be able to operate smoothly and efficiently in association with the taking out, raising and dispensing of ampules.

In an ampule feeder that can cope with these problems, preparation for discharging ampules in as short a time as possible is needed inside. Further, in such an ampule feeder, when an ampule discharge command is produced, if the number of ampules to be discharged is greater than the number of ampules prepared for discharge, when all the ampules prepared are discharged, ampules that are short have to be resupplied and discharged. Such resupplying and discharging also have to be carried out speedily and efficiently.

An object of this invention is to provide an ampule feeder which can solve various problems by connecting discharge means for temporarily storing a predetermined number of ampules to a dispenser of the ampule feeder to instantly discharge ampules one by one in response to a discharge signal.

Another object of this invention is to provide an ampule feeder which can resupply and discharge ampules speedily and efficiently when ampules are discharged by the discharge means.

Still another object of this invention is to provide an ampule feeder which can set sensors for checking the existence of ampules stored in the discharge means by the ampule feeder so as to operate correctly without the need for mounting adjustment.

SUMMARY OF THE INVENTION

According to this invention, there is provided an ampule feeder comprising an ampule container in which are randomly stored many ampules, an ampule receiver provided on one side of the ampule container and moved up and down with the ampules received orderly from the ampule receiver, a dispenser means for dispensing the ampules on the ampule receiver out of the ampule container one at a time, a discharge means for storing the dispensed ampules and discharging them one by one, and a control unit for detecting the existence of the ampules dispensed from the dispenser and for controlling the ampule receiver and the dispenser means in cooperation with the discharge means such that if no ampules are detected in the discharge means, a required number of ampules are stored.

With the ampule feeder according to this invention, ampules are discharged by the control unit in the following manner. Ampule feeders are e.g. a plurality of cylindrical devices arranged in tiers. Different kinds of ampules are stored in different feeders. Based on prescription data for each patient entered into the host computer, a discharge signal is transmitted to each control unit, which is a computer of each ampule feeder.

When such a discharge signal is fed to a specific ampule feeder, the control unit of the particular ampule feeder controls a drive unit in response to the command to discharge ampules. In order to discharge ampules immediately when the ampule discharge command is inputted, it is necessary to take a necessary number of ampules out of the ampule container, dispense them and store them in the discharge means. Thus, before the discharge command is inputted, ampules are dispensed into the discharge means beforehand for waiting preparation.

But in the case of the random-storage type, if trials are made to take ampules one by one out of the container, it may be sometimes difficult to dispense ampules reliably for every dispensing operation. Thus, in controlling the ampule receiver, dispensing means and discharge means, the control unit repeatedly actuates the ampule receiver and the ampule dispenser every time no riding of ampules into the discharge means is detected to repeat the same operation until a necessary number of ampules are received in the ampule receiving grooves of the rotor of the discharge means for waiting preparation to store the necessary number of ampules.

According to the present invention, the detecting action of the sensors provided in the discharge means is judged by different reference values for the respective sensors based on the setting of a threshold by the control unit.

Other features and objects of the present invention will become apparent from the following description made with reference to the accompanying drawings, in which:

BRIEF DESCRIPTION OF THE DRAWINGS

FIG. 21 is a flowchart showing a threshold setting operation of an ampule feeder of the seventh embodiment.

DETAILED DESCRIPTION OF THE PREFERRED EMBODIMENT

Figure 1:
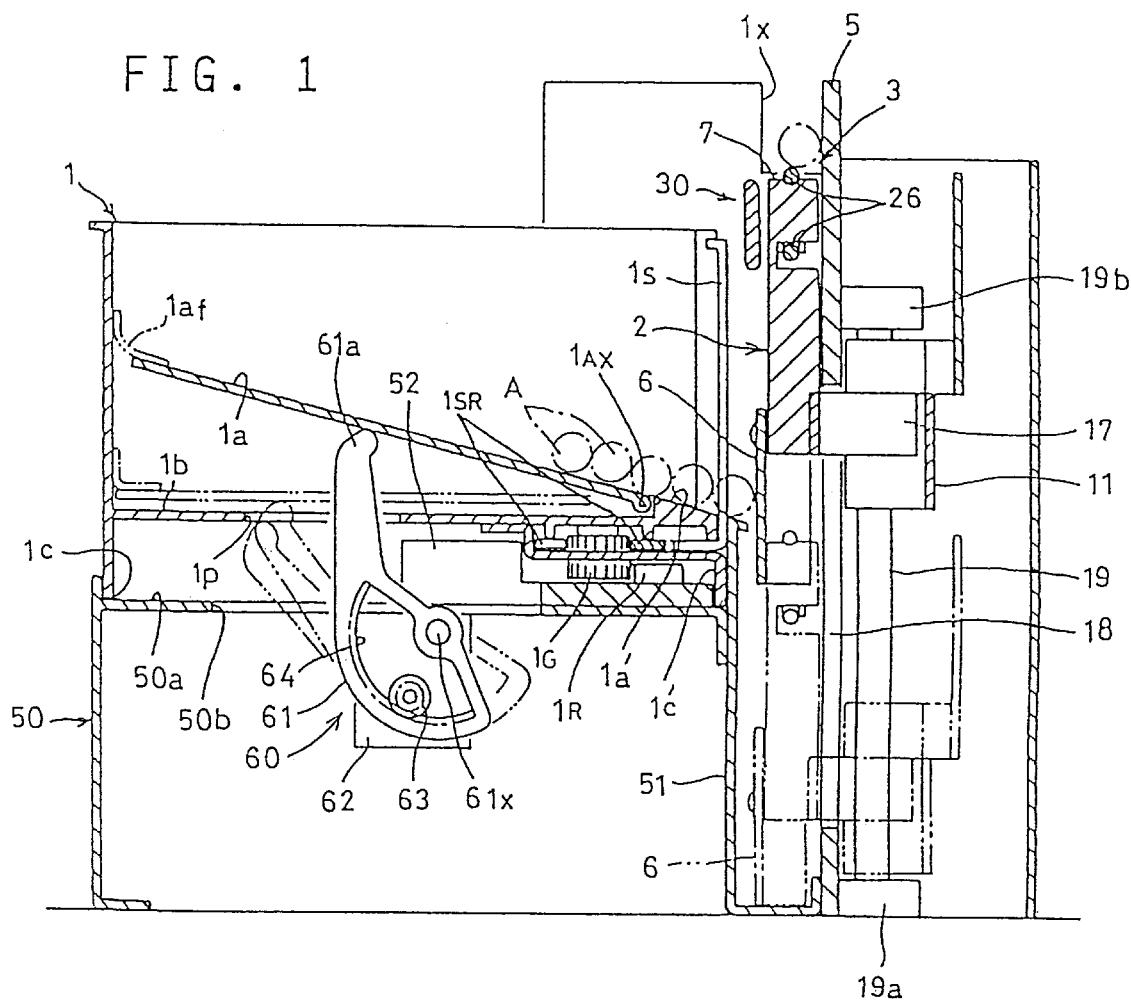
FIG. 1 is a sectional view of an ampule feeder.

Embodiments of this invention are now described with reference to the drawings.

This ampule feeder has an ampule storage container 1, an ampule receiver 2 provided along one side wall of the container 1, a dispenser 3 provided on the ampule receiver 2 for discharging the ampules, and a discharge means 40 including a rotor 41.

The ampule container 1 is a container which can randomly accommodate many ampules A. It is detachable from a shelf of the ampule feeder. The boundary between the ampule receiver 2 and the ampule container 1 can be opened and closed by a shutter 1s. When the ampule container 1 is set in the ampule feeder, the shutter 1s opens. When the ampule container 1 is slid out of the ampule feeder, the shutter 1s closes, shutting off ampules A in the container.

As shown, a shelf 50 for mounting the ampule container 1 is provided on one side of the ampule receiver 2. The ampule container 1 is mounted on and dismounted from the shelf 50 by being inserted and pulled out, guided by its bottom leg 1c and bottom leg plate 1c'.

The ampule receiver 2 is separated from the container 1 by a shelf side plate 51 provided therebetween. Inside the top end of the shelf side plate 51, shutters 1s of the ampule container 1 are opened and closed by sliding in the longitudinal direction of the ampule receiver 2. The shelf of the ampule feeder has a shelf rack 1R for driving a drive gear 1G for opening and closing the shutters 1s. When the ampule container 1 is set, the drive gear 1G meshes with and is rotated by the shelf rack 1R. The container 1 is thus set in position.

With the rotation of the drive gear 1G, shutter racks 1SR provided opposite the drive gear 1G move away from each other. The shutters 1s thus move away from each other and open, allowing ampules in the ampule container 1 to be fed onto the ampule receiver 2.

The container has a bottom plate 1a inclinable in one direction. Its details are described later. The ampule receiver 2 is moved up and down guided along the inner surface of a side wall 5 provided near one end of the bottom plate 1a. The ampule receiver 2 is moved up and down through the space between the side wall 5 and a shutter 6 provided slightly spaced inwardly from the side wall 5. The shutter 6 has its top end connected to the bottom end of the ampule receiver 2. The shutter 6 prevents the ampules A on the rising ampule receiver 2 from falling into the space below.

The ampule receiver 2 of the embodiment has a length substantially equal to the width of the side wall 5 and at least 1.5 times the length of ampules. This oblong thick plate member is arranged laterally and can be raised up and down. Ampules are received on its flat top surface 7. The ampule receiver 2 has a thickness substantially equal to the diameter of ampules.

Figure 3:
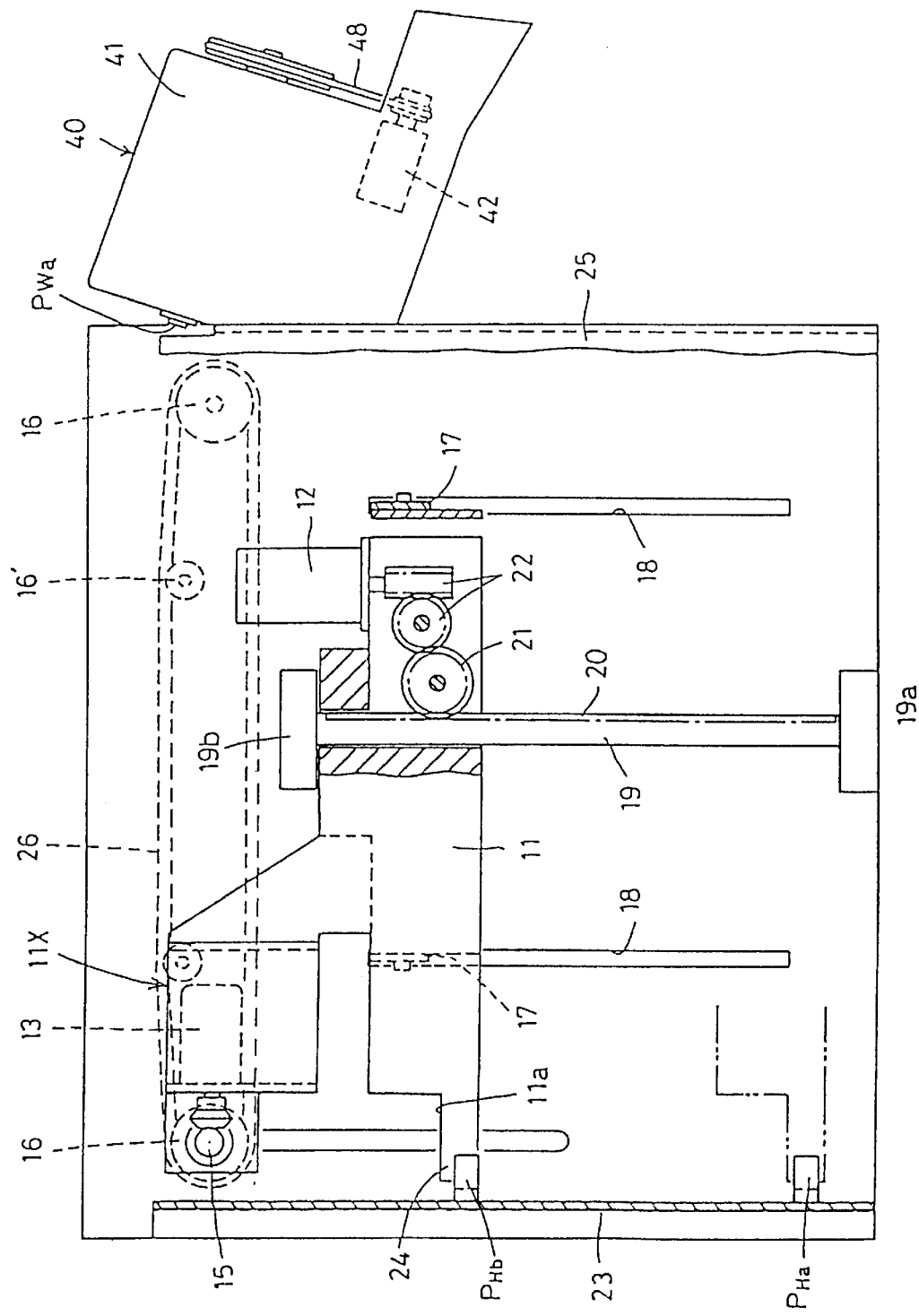
FIG. 3 is a side view thereof.

FIG. 3 shows the details of a drive unit for moving the ampule receiver 2 up and down that is provided outside the side wall 5. The drive unit includes a support plate 11 carrying a motor 13 for driving the dispenser 3, and a motor 12 for moving the ampule receiver. The motor 13 has an output shaft coupled to a pulley shaft 15 for driving one of pulleys 16 supported by a support arm 11x. At both ends, the support plate 11 carries a pair of arms 17 extending through vertical guide grooves 18 formed in the side wall 5 and coupled to the ampule receiver 2.

A rod 19 extends slidably through substantially the center of the support plate 11 in parallel to the arms 17. On one side, the rod 19 has a rack 20 in engagement with a speed reducer comprising a pinion 21 and gears 22. The support plate 11 is raised up and down by driving the speed reducer from the motor 12. The rod 19 has top and bottom ends 19a, 19b.

Two vertical position sensors PHa and PHb are provided on a sensor mounting plate 23 at its intermediate and lower portions, respectively. When a detection plate 24 at one end of the support arm 11x passes by the respective sensors, the sensors detect that the ampule receiver 2 is at the highest and lowest levels, respectively, and stop the ampule receiver. Numeral 25 designates a mounting plate. The dispenser 3 is a conveyor comprising an endless belt 26 trained around the pulleys 16. Driven by the motor 13, the dispenser 3 discharge ampules A on the ampule receiver 2.

As shown in FIG. 1, the bottom plate 1a of the ampule container 1 is pivotable about a horizontal shaft AX and has a front edge member 1a' integral with a horizontal back bottom plate 1b. An inclination adjuster 60 for adjusting the inclination angle of the bottom plate 1a is provided to straddle a top plate 50a of the shelf 50 and the back bottom plate 1b. The inclination adjuster 60 comprises a hook-shaped pusher 61 and a motor 62 for pivoting the pusher 61.

The motor 62 is mounted on the back of the top plate 50a and has an output shaft to which is mounted a pinion 63 in mesh with a half-moon-shaped gear provided on the inner periphery of the pusher 61. By pivoting the pusher 61 about a rotary shaft 61X, the bottom plate 1a is pushed up and inclined by a tip 61a of the pusher. The top plate 50a and the back bottom plate 1b are formed with narrow slits 50b and 1p through which the tip 61a of the pusher 61 can swing up and down.

Preferably, a cover 1af made of a resilient material such as rubber and cloth is provided at the front end of the bottom plate 1a to fill a gap produced when the bottom plate 1a is inclined. The inclination angle of the bottom plate 1a may be changed continuously or stepwise. While the bottom plate 1a is inclined in one direction in the embodiment, second inclinable bottom plates may be provided on both sides of a narrower bottom plate 1a with respect to the direction perpendicular to the direction in which the bottom plate is inclined so that the bottom plate 1a is inclinable in two or more directions.

Figure 2:
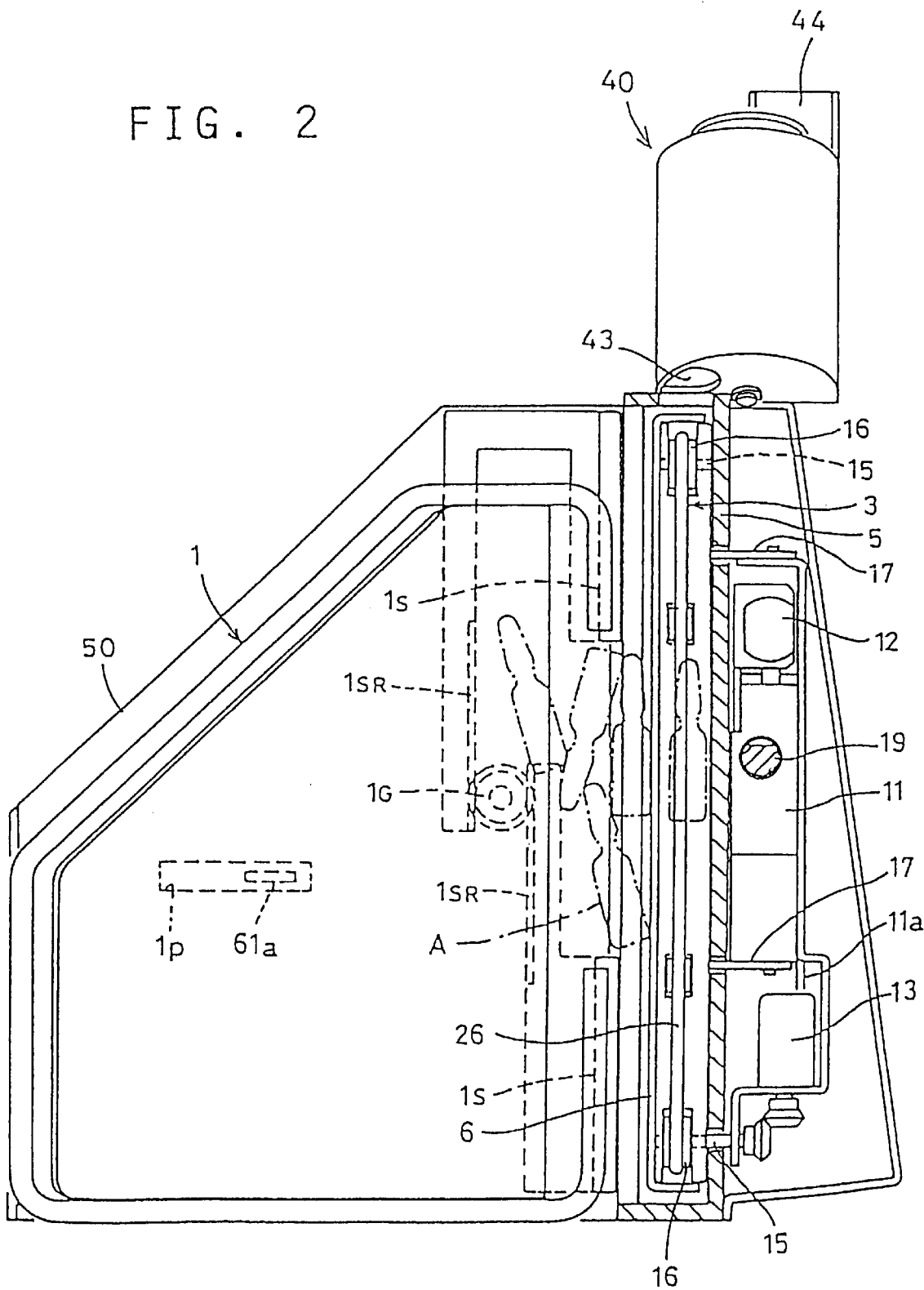
FIG. 2 is a plan view thereof.
Figure 6A:
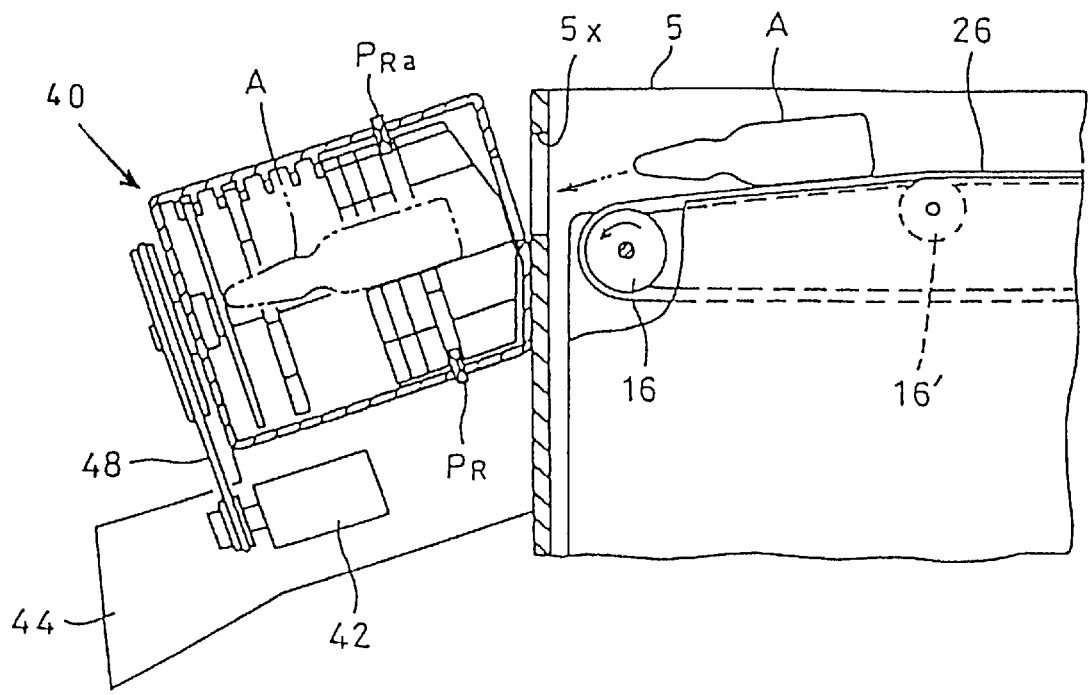
FIG. 6 is a schematic operational view.
Figure 6B:
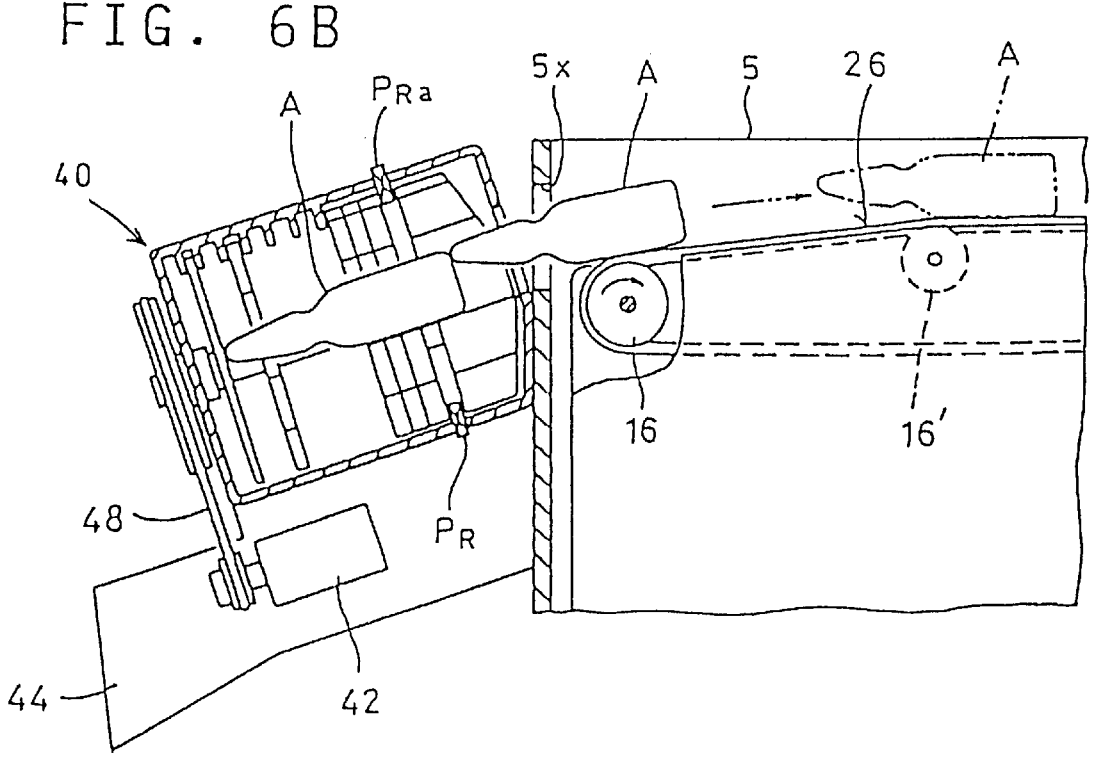

In this embodiment, as shown in FIG. 2, the discharge means 40 is inclined a small angle (18° in the embodiment of FIG. 6) so that one of the grooves 43 formed in the discharge means 40 aligns with the discharge direction of the dispenser 3", and that the inclination angle of the grooves 43 is equal to that of the outlet of the dispenser 3. The discharge means 40 has five grooves 43 so that a greater number of ampules can be stored in the grooves 43.

Figure 4:
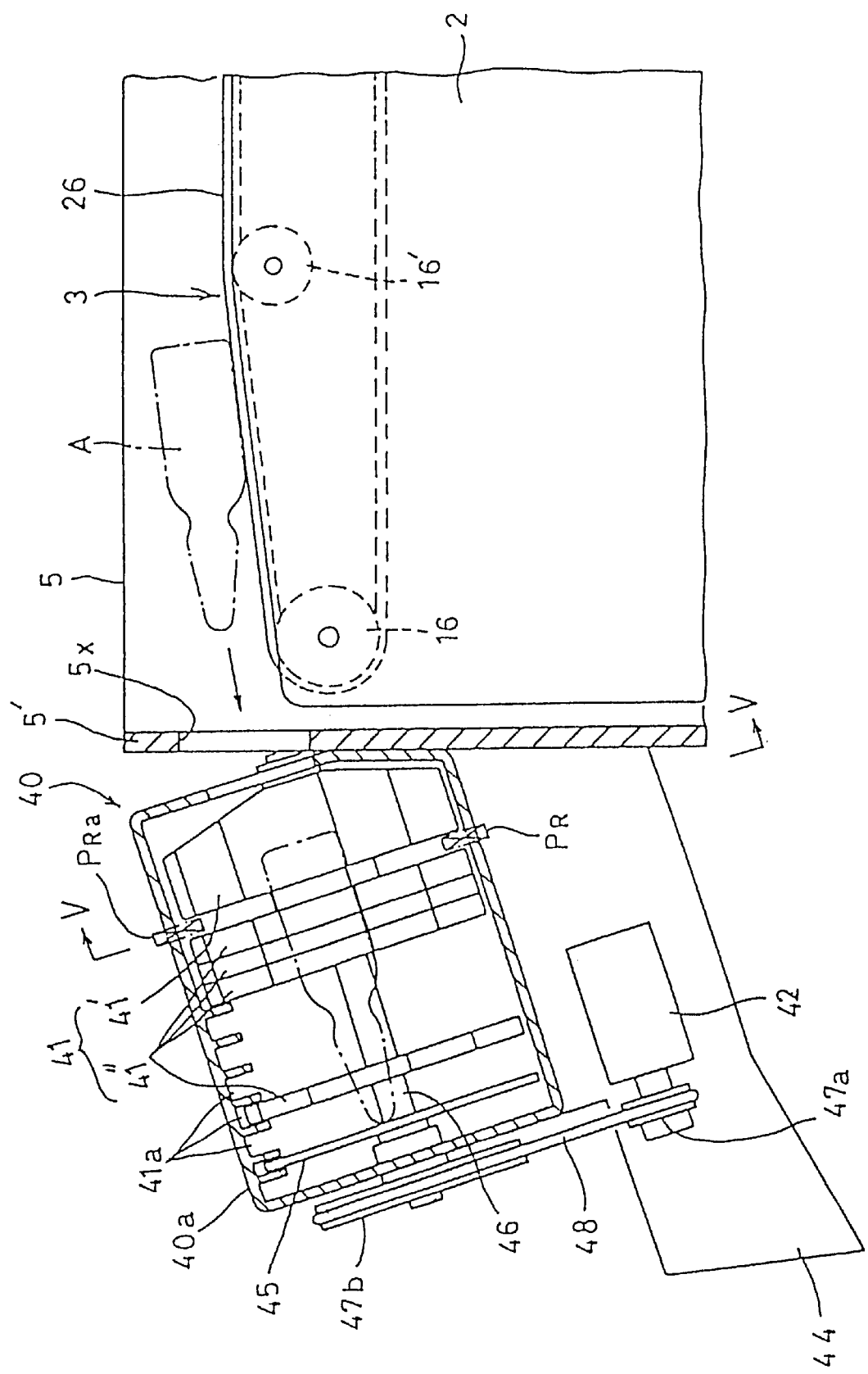
FIG. 4 is a sectional view near a discharge means.

As shown in FIG. 4, an endless belt 26 of the discharge means 3 is provided at the top end of the ampule receiver 2 moved up and down along the side wall 5. The upper portion of the endless belt 26 is partially raised by a small pulley 16' so that its portion between the small pulley 16' and a pulley 16 is slightly inclined substantially the same angle as the discharge means 40.

Figure 5A:
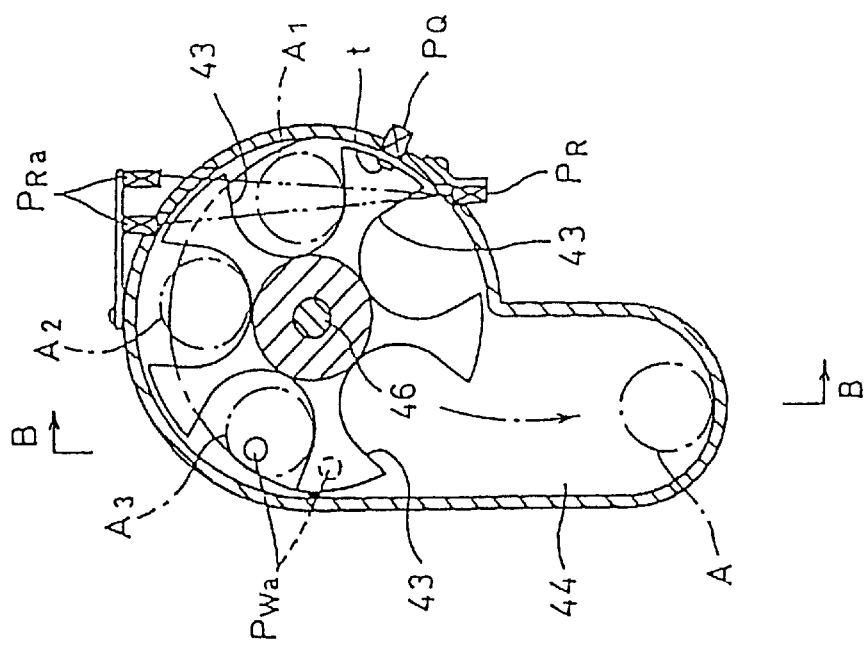
FIG. 5A is a sectional view as viewed from line V—V of FIG. 4.

The adjacent rotor disks 41' and 41"are spaced by predetermined gaps through which light is transmitted from a light-emitting sensor PR to light-receiving sensors PRa both mounted on the body 40a. As shown in FIG. 5A, the light-receiving sensors PRa comprise two elements provided within a predetermined angle.

Two light-receiving elements PRa are provided so that when one of the two detects that an ampule A has been received in a groove 43, it can determine that there is an ampule. If there is only one light-receiving element PRa, it may sometimes be impossible to detect that an ampule A has been received, with high reliability. PQ is a position sensor for the rotor 41. When it detects a reaction element (or magnetic body) mounted on fixed position of the rotor 41, it will give a signal.

Figure 5B:
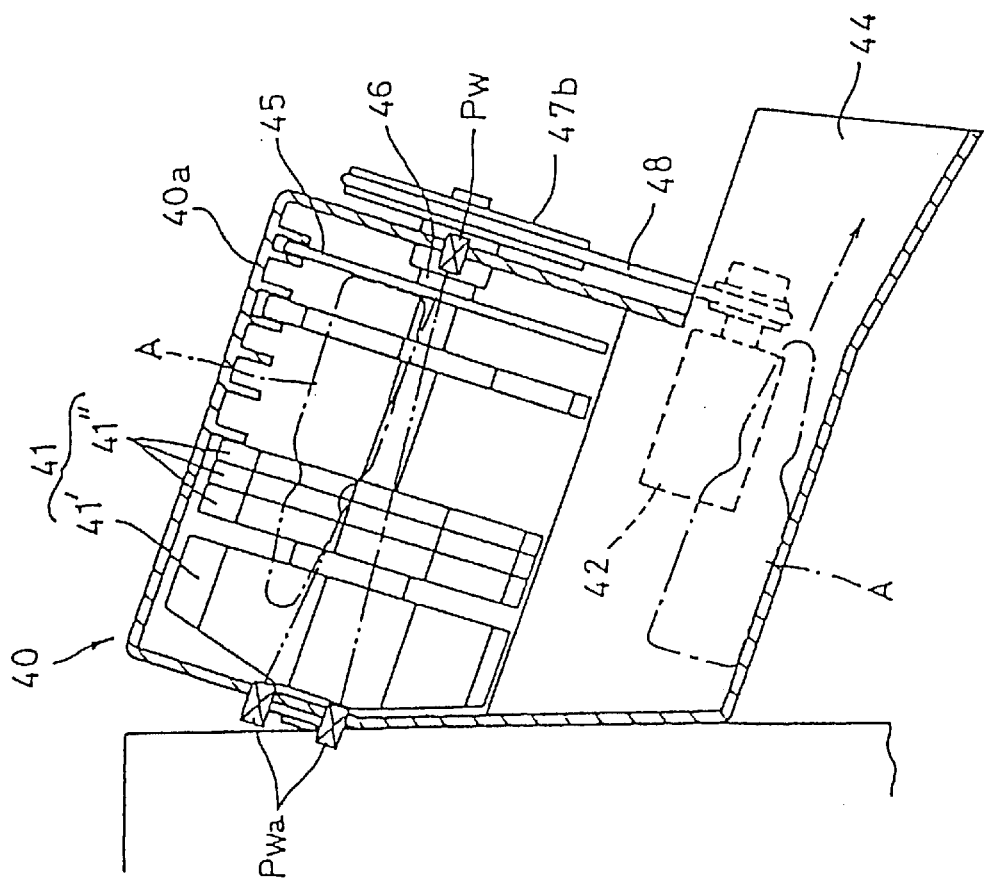
FIG. 5B is a vertical section taken along line B—B of FIG. 5A.

FIG. 5B shows sensors PW and PWa for determining if an ampule A is waiting one step before an ampule A falls from a groove 43 by projecting light in substantially the same direction as the grooves 43 extend. Like the sensors PR and PRa, the sensors PW and PWa may comprise two light-receiving sensors PWa and one light-emitting sensor PW for improved detection accuracy.

Figure 7:
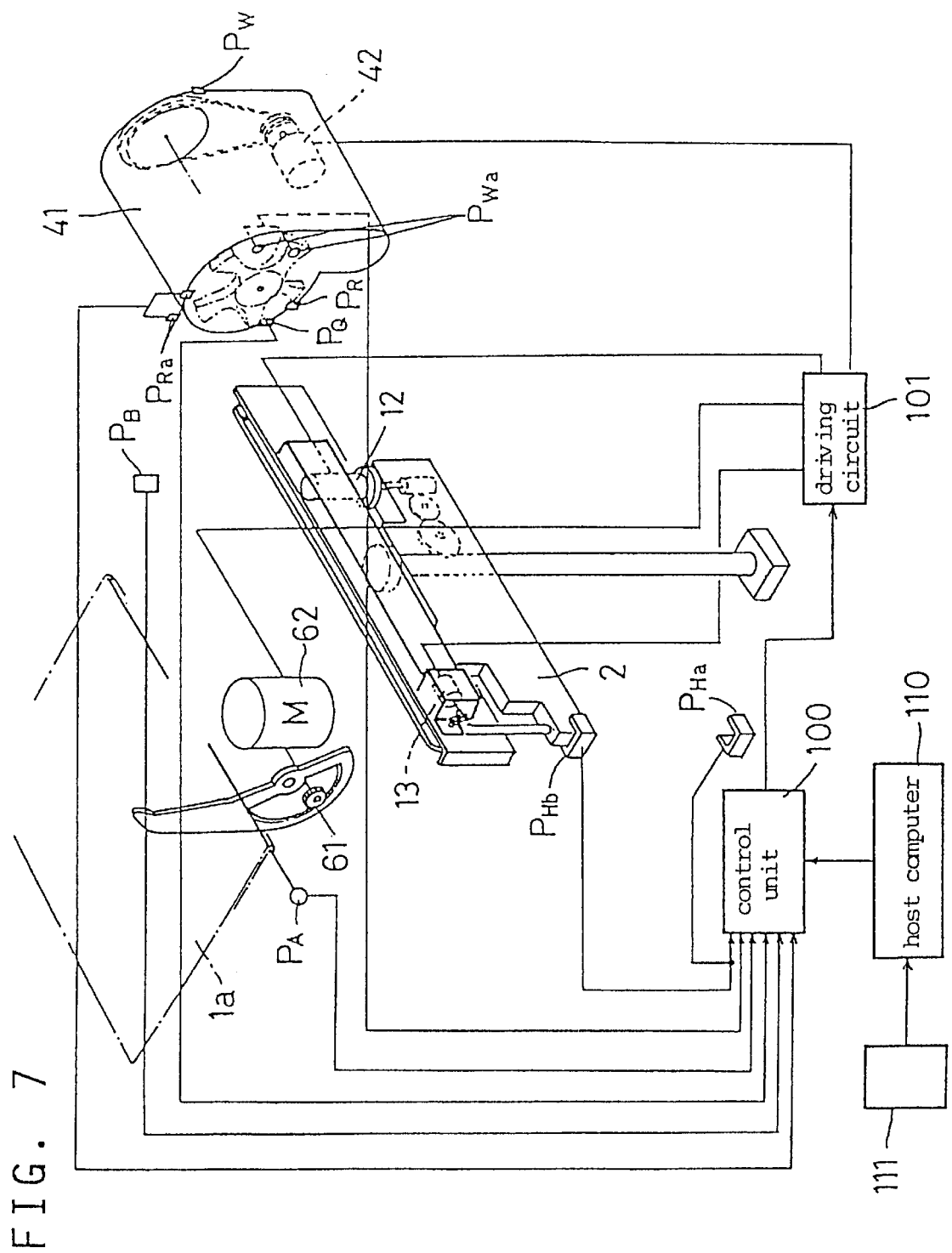
FIG. 7 is a schematic block diagram of a control circuit.

FIG. 7 shows a schematic block diagram of a control circuit for controlling the ampule feeder of the above structure. As shown, various signals are entered into a control unit 100 as input signals. PA is an angle sensor for detecting the angle of the bottom plate 1, and PB is a position sensor for detecting that the ampule container 1 is mounted on a predetermined position. The ampule receiver 2 is provided with sensors PHa (upper limit) and PHb (lower limit) provided at appropriate positions of the end of the side wall 5 for detecting its vertical position at its upper and lower limit. PR, PRa, PW and PWa are as described above.

Upon receiving the various sensor signals, the control circuit outputs control signals from the control unit 100 to a drive circuit 101 to drive and control various units to be controlled, which are the abovementioned four motors 12–15. When prescription-based drug data for each patient are entered into a host computer through an input means 111, ampule dispensing signals are sent to the ampule feeder based on this information when necessary.

Figure 8:
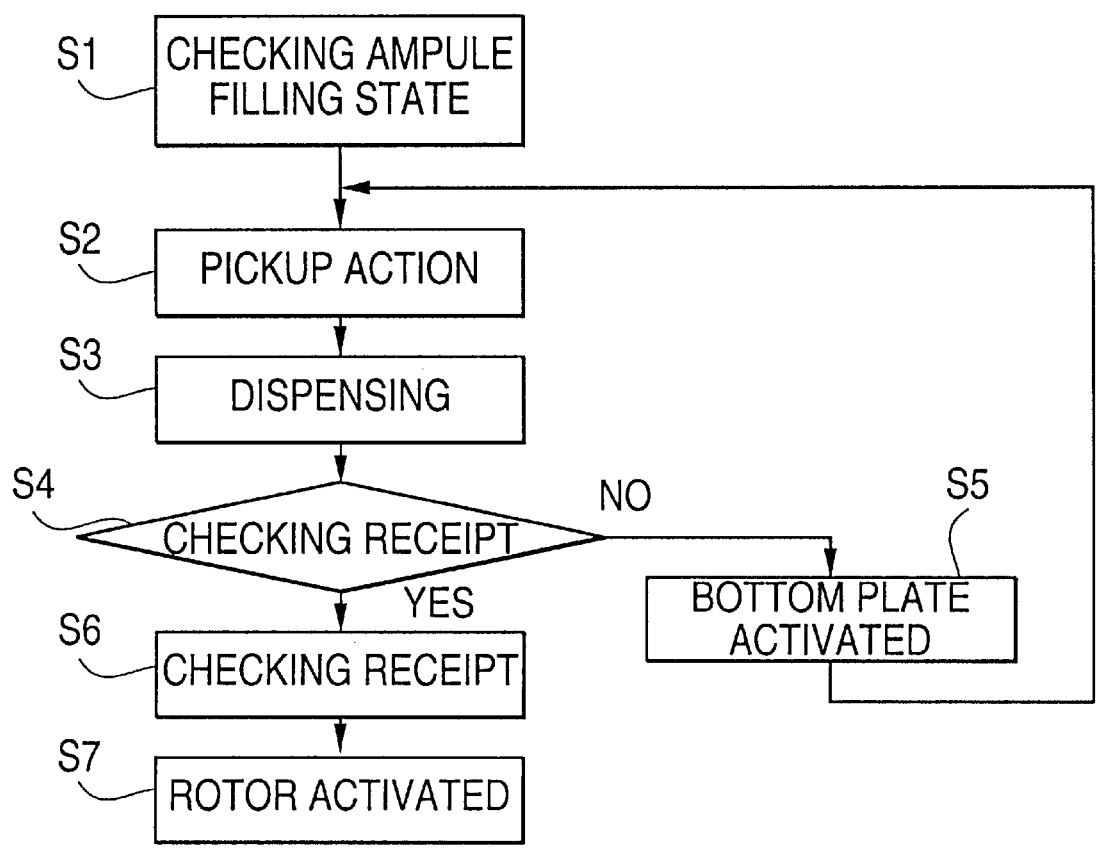
FIG. 8 schematically shows the flow of operation.

The operation of the ampule feeder of the embodiment is now described. FIG. 8 shows the steps of operation in the order of execution. The illustrated operational steps are only portions of the detailed flowchart to be described later. The operation of the ampule feeder comprises a preparation step before an ampule dispensing signal from a host computer is received by a specific ampule feeder so that ampules can be dispensed upon receiving the dispensing signal, and the step of dispensing ampules by activating the rotor in response to the dispensing signal.

As shown in FIG. 8, in Step S1, the control unit checks if ampules are in the grooves of the rotor 41. In S2, the ampule receiver 2 (which is referred to as "pickup" on the drawings) is raised and lowered to raise ampules in order. In S3, ampules are dispensed into the discharge means 40 by activating the dispenser 3.

In S4, in the discharge means 40, the control unit checks if one ampule has been received in a groove 43 (which is referred to as "checking receipt" on the drawings). If no ampule has been received, NO judgment is made and the bottom plate is moved up and down to stir ampules in S5.

If an ampule is detected in a groove 43, ampules are inserted one after another into other grooves 43 until a necessary number of them are received in grooves 43. In S6, the control unit checks if a necessary number of ampules have been received in grooves 43. If they are, a dispensing signal is produced to dispense the ampules. Needless to say, this preparation step is repeated, that is, every time a first predetermined number of ampules have been dispensed, another predetermined number of ampules are inserted into the now empty grooves.

Figure 9:
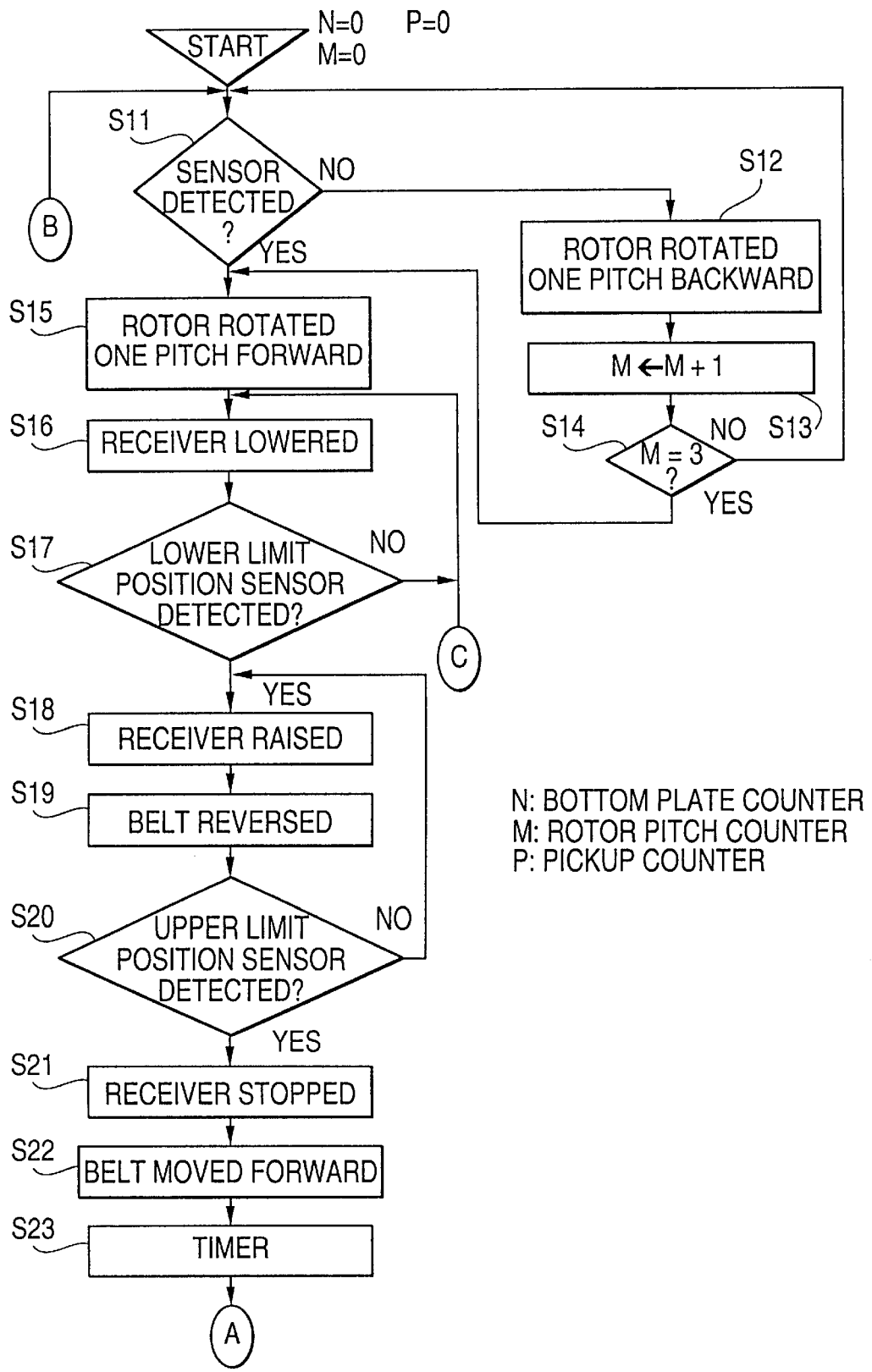
FIG. 9 is an operational flowchart.
Figure 10:
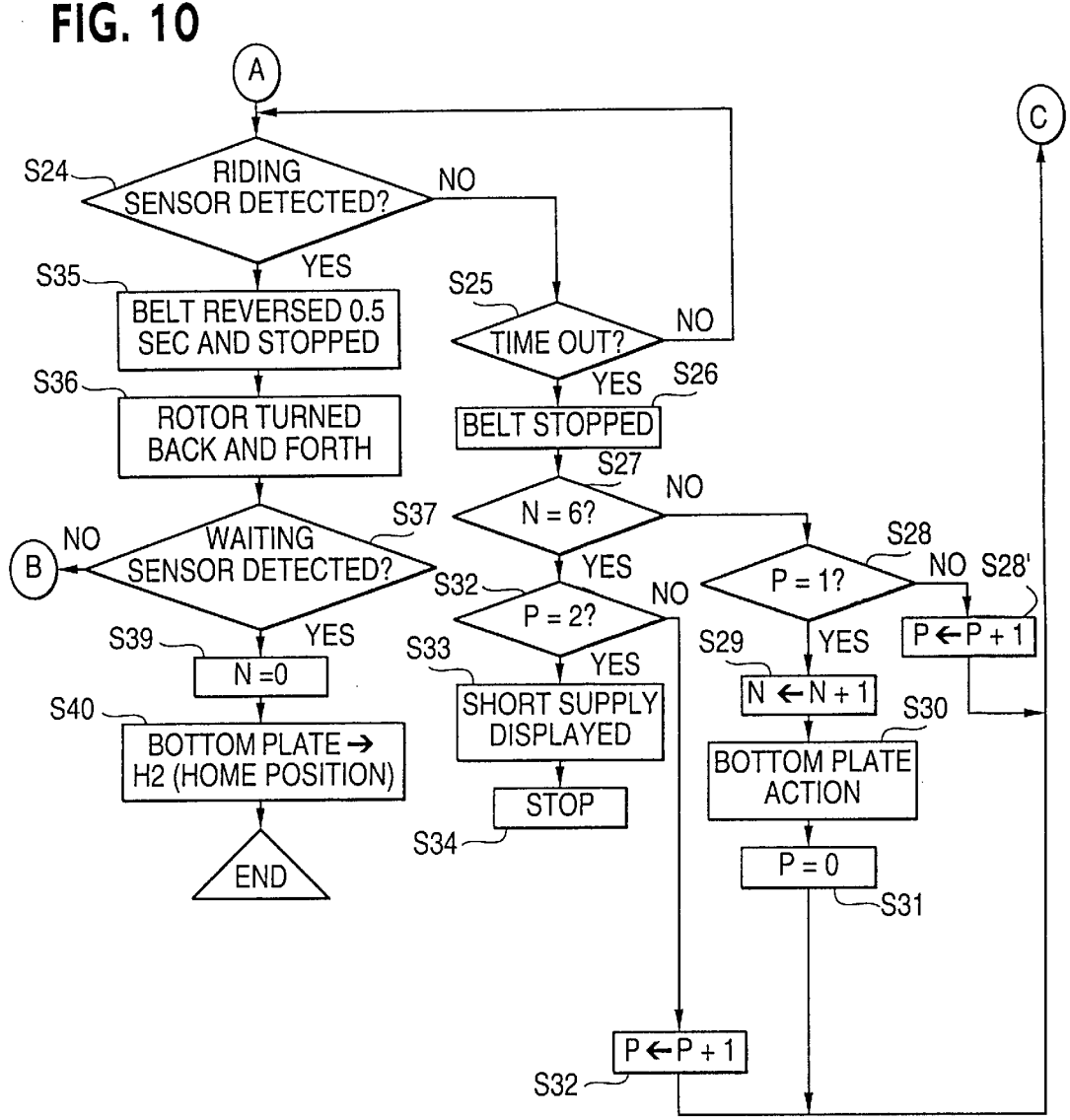
FIG. 10 is an operational flowchart.

The operation is described in detail with reference to the detailed flowcharts of FIGS. 9 and 10. Though not shown in the block diagram of FIG. 7, the device includes a bottom counter N, a rotor pitch counter M, and a pickup counter P as hardware or as software programs stored in the control unit 100. Variable N set by the bottom plate counter N is, as will be described later, a state variable corresponding to the inclination state of the bottom plate 1a when it is moved up and down.

At the start of the ampule filling step, variables N, M and P of the counters N, M and P are set at zero. The moment the device is turned on, the bottom plate ls is held in a home position, i.e. a horizontal position, and the ampule receiver in its upper-limit position.

In Step S11, the control unit checks if ampules are in the groove 43 of the rotor 41 at the ampule receiving position through the sensors PR and PRa. For example, if there is no ampule at the position of ampule A1 in FIG. 5A, the rotor 41 is turned one pitch backward in S12. The forward rotation is counterclockwise shown by arrow. Thus, by rotating the rotor backward, the groove at the position of ampule A2 comes to the position of ampule A1.

In S13, one is added to the variable of the rotor pitch counter M. In S14, the control unit asks M=3? Since M=1, the answer is no. Thus, the control unit returns to the beginning and checks if ampules are received. If no ampule is found in the groove 43 which has been moved from the position of ampule A2 to that of ampule A1, the rotor 41 is moved another pitch backward in S12 to move position A3 to position A1. In S13, one is added to M, making M=2. The answer to the question M=3? is still no. The control unit thus returns to the beginning of the program again.

If no ampule is found by the sensors PR and PRa when the ampule A3 has been moved to position A1, the rotor is turned still another pitch backward, and one is added to M. Since M is now 3, the program now proceeds to Step S15. The rotor is turned backward to cancel any slight position shift when the ampule A3 has been moved to position A1 due e.g. to backlash of gears by moving the pitch rotor forward in the next step S15.

When A3 returns to position A1 by turning the rotor 41 one pitch forward in S15, the ampule receiver 2 is lowered in the next step S16. When the lower-limit sensor detects that the ampule receiver 2 has been lowered to the lower limit in S17, the ampule receiver 2 is raised in S18, and the endless belt 26 of the dispenser 3 is reversed in S19.

When the ampule receiver 2 has been lowered to the lower limit, ampules in the container 1 will be moved onto the ampule receiver 2 in a disorderly manner and raised with one ampule piled on another when the ampule receiver 2 is raised to the upper limit. To prevent this, the endless belt 26 is moved in reverse.

In S20, when the upper-limit position sensor detects that the ampule receiver 2 has been raised to the upper limit, the ampule receiver 2 is stopped in S21. In S22, the endless belt 26 is moved forward to feed the ampules on the ampule receiver 2 toward the rotor 41 of the discharge means 40, and in S23, the timer is started. A in FIG. 9 is connected to A in FIG. 1.

In S24, the control unit detects that ampules have been received in the rotor 41. But the control unit cannot determine from which position of the endless belt the ampules have been received. Thus, the time taken for an ampule to travel the maximum distance is set by the timer, and if no ampules have been received within the time thus set (yes in S25), the endless belt 26 is stopped in S26.

In S27, the control unit checks if the variable of the bottom plate counter N is 6. If no, the program proceeds to S28. Variable N of the bottom plate counter N is set as follows. The bottom plate 1a is, as described above, inclinable in one direction. As the number of ampules in the container decreases, the bottom plate is more steeply inclined stepwise so as to pick up all the ampules as smoothly as possible.

The horizontal and inclined positions of the bottom plate 1a are shown as follows:

H1 . . . unlocked
H2 . . . horizontal
H3 . . . small inclination angle
H4 . . . large inclination angle As described above, the moment the ampule feeder is activated, the pusher 61 of the inclination adjuster 60 moves to set the bottom plate 1a from the unlocked state to the horizontal state H2. Thus, H2 is the reference position.

Since this device cannot determine if the ampule storage container is full of ampules, only half full, or nearly empty, whenever no ampules are found in the rotor 41, the bottom plate is moved up and down in the following order to stir ampules, regardless of whether the container is full or empty.

| N | 0 | 1 | 2 | 3 | 4 | 5 | 6 |
|---|---|---|---|---|---|---|---|
| Bottom plate 1a | $H_2 \rightarrow$ | $H_3 \rightarrow$ | $H_2 \rightarrow$ | $H_3 \rightarrow$ | $H_4 \rightarrow$ | $H_3 \rightarrow$ | $H_4 \rightarrow$ |

Variable N is, as mentioned earlier, a state variable corresponding to the inclination angle of the bottom plate 1a. But all the movements of the bottom plate are not necessarily done because sometimes the bottom plate does not have to be inclined at a large angle.

Initially, the control unit judges no in S27 because the bottom plate 1a is in the reference position H2 (N=0). The program thus proceeds to the next step S28, in which P is not one because the ampule receiver 2 has been moved only once. One is thus added to P and the program returns to S16 as shown by C.

The program thus proceeds from S16 to S24 to check again if ampules have been received in the rotor 41. If no ampules have been detected in the rotor 41 after the ampule receiver 2 is lowered and raised, and ampules have been fed by the endless belt 26, the program proceeds from S25 to S28.

Since no ampules have been detected in the second round, P is increased to one. Thus in S29, one is added to the state variable N of the bottom plate 1a, and in S30, the bottom plate 1a is moved to the state H3, which corresponds to N=1. In S31, variable P is cleared. The program then returns to S16.

In this way, the control unit lowers and raises the ampule receiver, and checks if ampules have been received in the rotor 41. If no ampule is detected in the receiver, the control unit inclines the bottom plate to position H3, lowers and raises the ampule receiver 2 again, and checks again if ampules have been received in the rotor. If ampules are still not detected, the control unit lowers and raises the ampule receiver 2 once again while keeping the bottom plate 1a at position H3, and checks once again if ampules have been received in the rotor.

If ampules are not detected after the ampule receiver 2 has been lowered and raised twice at position H3, the control unit adds one to N (N=2), moves the bottom plate 1a to its horizontal position in S30, clears P in S31, returns to S16, and move the ampule receiver 2 again. Thus, the control unit changes variable N, moves the bottom plate 1a up and down corresponding to variable N, and checks if ampules have been received. This cycle is repeated as long as no ampules are detected regardless of the inclination angle of the bottom plate.

When N=6 is reached in S29 and the bottom plate is moved to position H4, the control unit judges yes in S27 and proceeds to S32. If ampules are not detected three times P=0, P=1 and P=3 in S32, the control unit proceeds to S33 to display that no ampules remain in the container, and stops the feeder in S34.

The above description was made on the assumption that the ampule storage container 1 is empty or nearly empty. But actually, the ampule storage container is initially filled up with ampules. As ampules are discharged and the number of ampules remaining decreases, the ampules are detected in some checking stage.

When ampules are detected in the rotor in S24, the control unit moves the endless belt 26 for 0.5 second in S35. By moving the belt 26 in reverse, even if two ampules are on the belt, the rear one of the two can be pushed sufficiently backward. This prevents two ampules from being received in a single groove 43 of the rotor 41 simultaneously.

In S36, the rotor 41 is vibrated by moving it forward and backward within a small angle to let an ampule completely retract into a groove of the rotor until it touches the bottom of the groove, thus preventing the ampule from protruding from the groove. This is necessary because seals that may sometimes be stuck on ampules make it difficult for ampules to slip smoothly into the grooves.

In S37, a standby sensor confirms the standby state. As described above, how ampules are received in the grooves 43 of the rotor is detected by the sensors PR and PRa in steps from S11 to S15. If no ampules are detected at positions of A1 to A3, the sensors PR and PRa wait for the arrival of ampules. Thus, an ampule fed into the rotor 41 first gets into position of A3.

But the position of A3 is in the position A1 of FIG. 5A. Since no ampule is received in the position of A3 of FIG. 5A, the position of A3 is fed to the position of A2 by rotating the rotor by one pitch. When A2 comes to the position of A1, the arrival of the next ampule is waited. When the processing program returns to the first step S11 by rotating the rotor by one pitch forward, variable N is cleared to zero to move the bottom plate 1a back to the reference state.

In this standby position, when a second ampule is picked up and fed into the position of A2 according to the above flow, the rotor 41 is turned by another pitch. When a third ampule is fed into the position of A1, the ampule at the position of A3 is detected by standby sensors PW and PWa in S37. Filling of ampules into the rotor 41 is thus finished. The preparation step finishes when variable N is cleared in S39 and the bottom plate 1a is returned to the home position in S40.

As described above, when a discharge command signal is entered into the ampule feeder waiting with ampules received in the rotor 41 of the discharge means 40, the rotor 41 turns by predetermined pitches to discharge a necessary number of ampules. Soon thereafter, the next preparation step is started by the time the next discharge command signal is received.

When the preparation step is started, the number of ampules to be fed into the rotor grooves varies depending upon whether the number of ampules discharged in the previous cycle is one, two or three. Thus, sometimes the reparation is started from one of the intermediate steps. As the number of ampules increases and the number of ampules remaining in the container 1 decreases, the rotor will eventually fail to receive ampules. In such a case, the smaller the number of ampules remaining in the container, the greater the possibility that the up-and-down movements of the bottom plate 1a corresponding to N=0–6 are all carried out.

Figure 11:
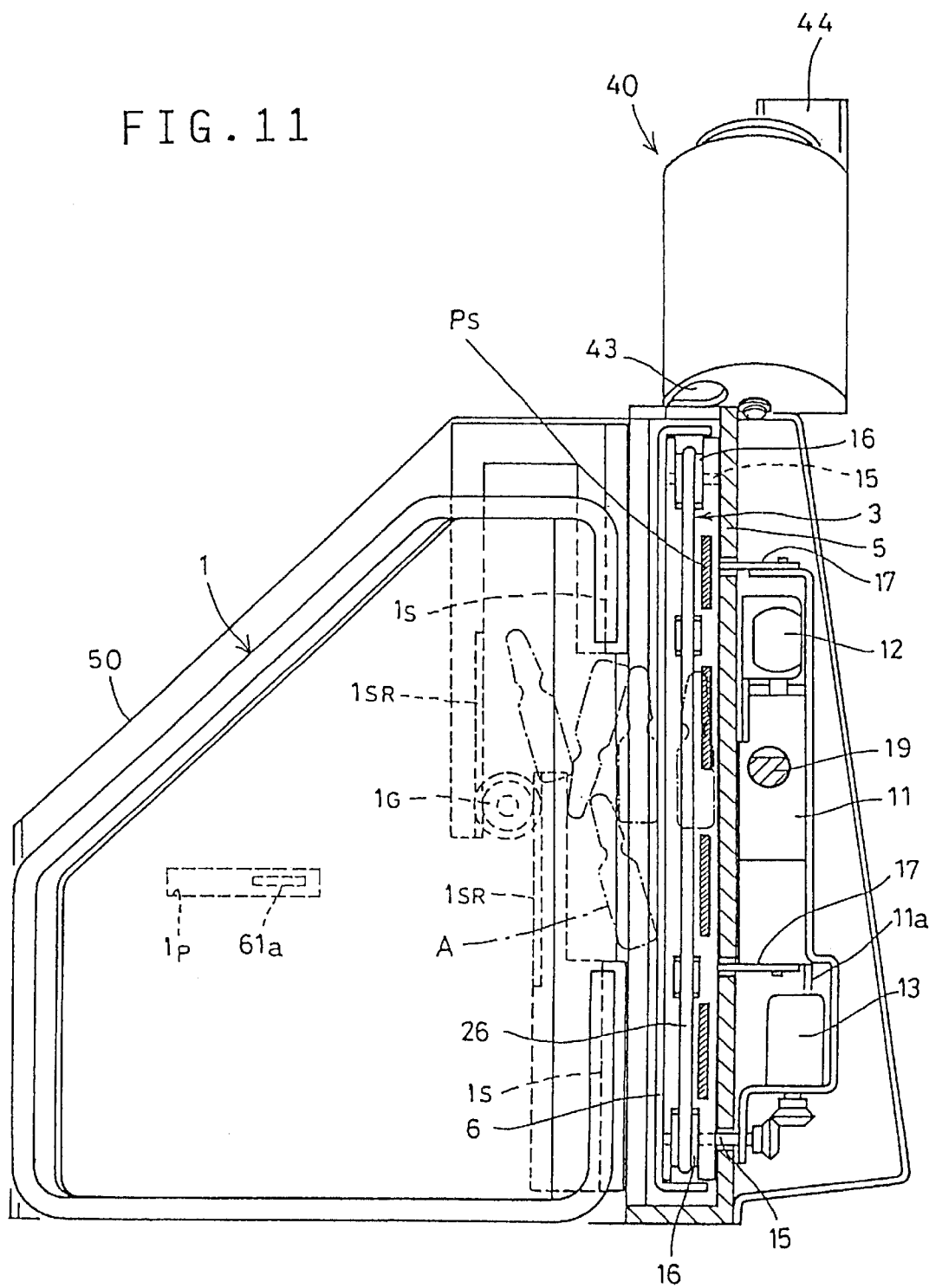
FIG. 11 is a plan view of an ampule feeder of a second embodiment having pickup sensors.

FIG. 11 shows a plan view of an ampule feeder of the second embodiment. In this embodiment, main members such as the ampule container 1, ampule receiver 2 and dispenser 3, are the same as those of the first embodiment. But as shown, this embodiment differs in that a plurality of pickup sensors Ps are buried in the ampule-receiving surface 7 of the ampule receiver 2 in its longitudinal direction. The pickup sensors Ps are buried at equal intervals smaller than the length of ampules to detect ampules on the ampule receiver 2.

The pickup sensors Ps are reflecting beam sensors in the embodiment, but may be any other sensors which can detect ampules such as noncontact sensors and transmissive sensors. The pickup sensors are provided to dispense ampules from the dispenser 3 into the discharge means 40 with high accuracy and efficiency in a short time. By directly detecting that ampules are on the ampule receiver 2, it is possible to dispense ampules efficiently and quickly.

Figure 12:
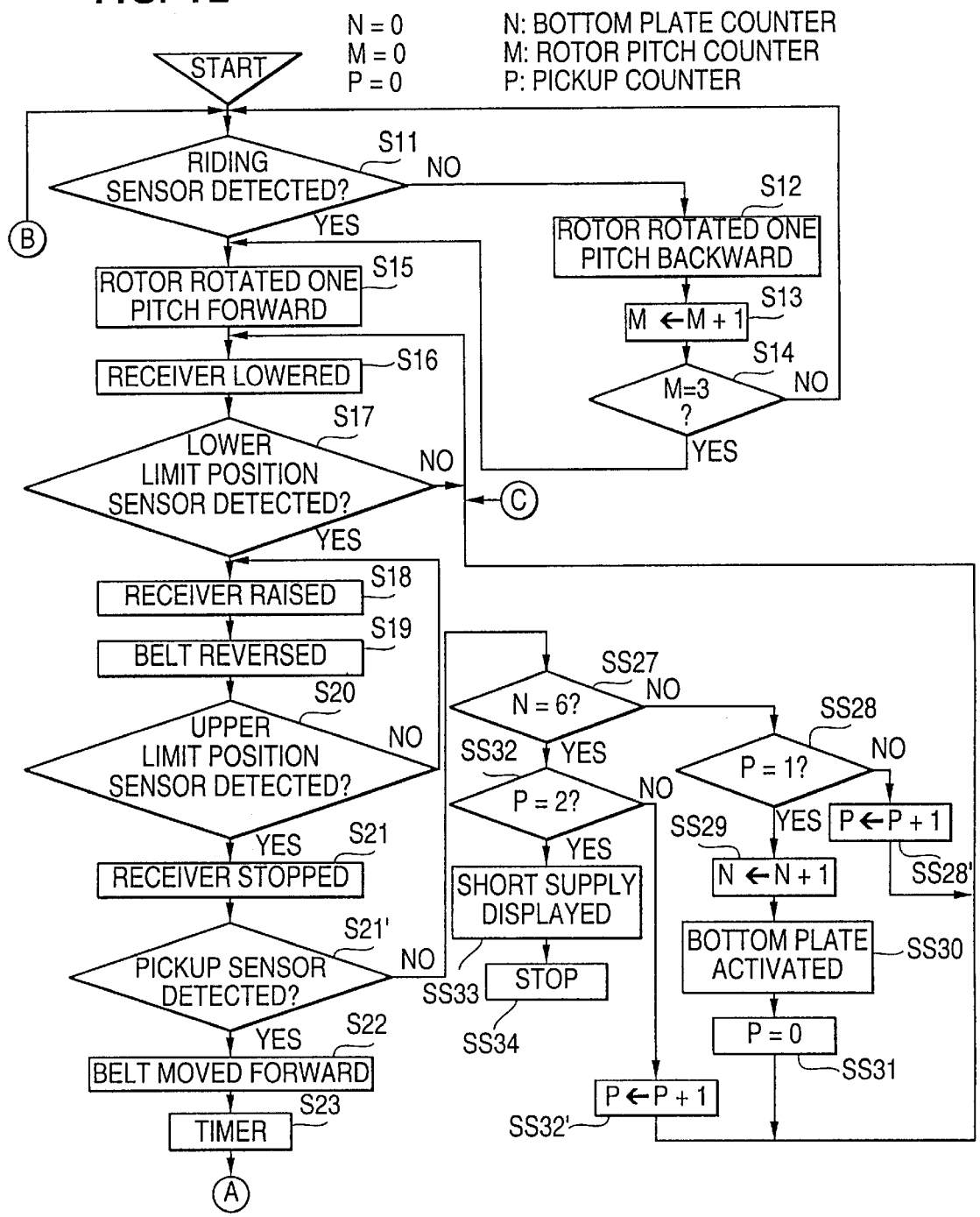
FIGS. 12 and 13 are flowcharts showing the operation of the ampule feeder of the second embodiment.

FIG. 12 shows a flow that can achieve more efficient and speedy preparation step in this embodiment. What makes this flow different from the flow of FIG. 9 is the addition of a judgment step by the pickup sensors Ps. The same portions of the flow are denoted by the same numerals and not described. Below, what differs from the flow of FIG. 9 are mainly described.

As shown, when the preparation step starts, the program is processed in the similar manner as in the first embodiment from Step S11 to S21. In S21', the pickup sensors Ps search for any ampules on the ampule receiver 2.

If the pickup sensors Ps detects any ampule, the belt is moved forward by the detection signal to feed the ampules into the rotor. In S24, how ampules are received is detected by the sensor PR. In S37, how ampules are prepared is detected by the standby sensor Pw. These operations are also performed in the first embodiment.

But in S21', if no ampule is detected by the pickup sensors Ps, or if no ampules are detected in the rotor though ampules are detected by the pickup sensors due to a bridge phenomenon in which ampules are locked together and stuck on the ampule receiver 2, this embodiment can cope with this problem more quickly and speedily than the first embodiment.

If no ampules are detected by the pickup sensors Ps in S21', the bottom plate is instantly inclined in the same way as in steps after Step S27 of the first embodiment. Since this bottom plate is inclined following the same steps as Steps S27–S37 of the first embodiment, these steps are denoted by the same numerals 27–34 with SS added thereto and not described. The bottom plate is inclined without setting the timer according to the result of detection by the pickup sensors Ps. Thus, the bottom plate can be inclined much more quickly than in the first embodiment.

Figure 13:
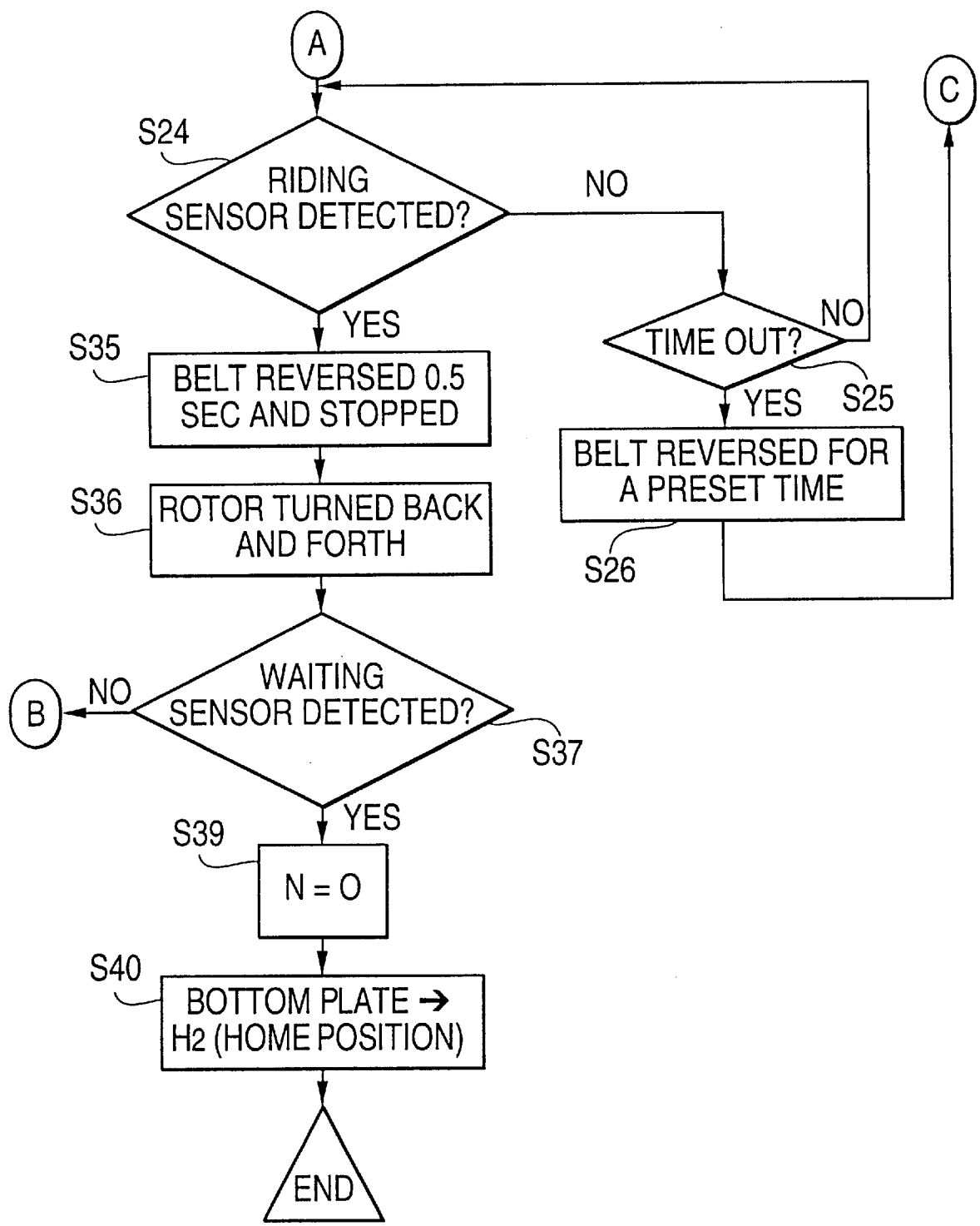

On the other hand, if no ampules are detected in the rotor though ampules are detected by the pickup sensors Ps due to a bridge phenomenon, this fact is detected because a bridge timer expires in S25 as shown in FIG. 13. If this happens, the control unit moves the belt backward for a short time in S26, lowers and raises the ampule receiver 2 in S16 to break the bridge, and stops the ampule receiver 2 at its upper limit. In this state, the pickup sensors Ps again search for any ampules on the ampule receiver.

In the first embodiment, even if a smooth feed of ampules into the rotor is hindered by an ampule bridge, it is sometimes impossible to break such a bridge until the bottom plate is inclined in Step S27 and the following steps. In contrast, in this embodiment, as will be apparent from FIG. 13, the ampule bridge can be broken by raising and lowering the ample receiver 2 without inclining the bottom plate. The device of this embodiment thus works more efficiently and quickly.

Figure 14:
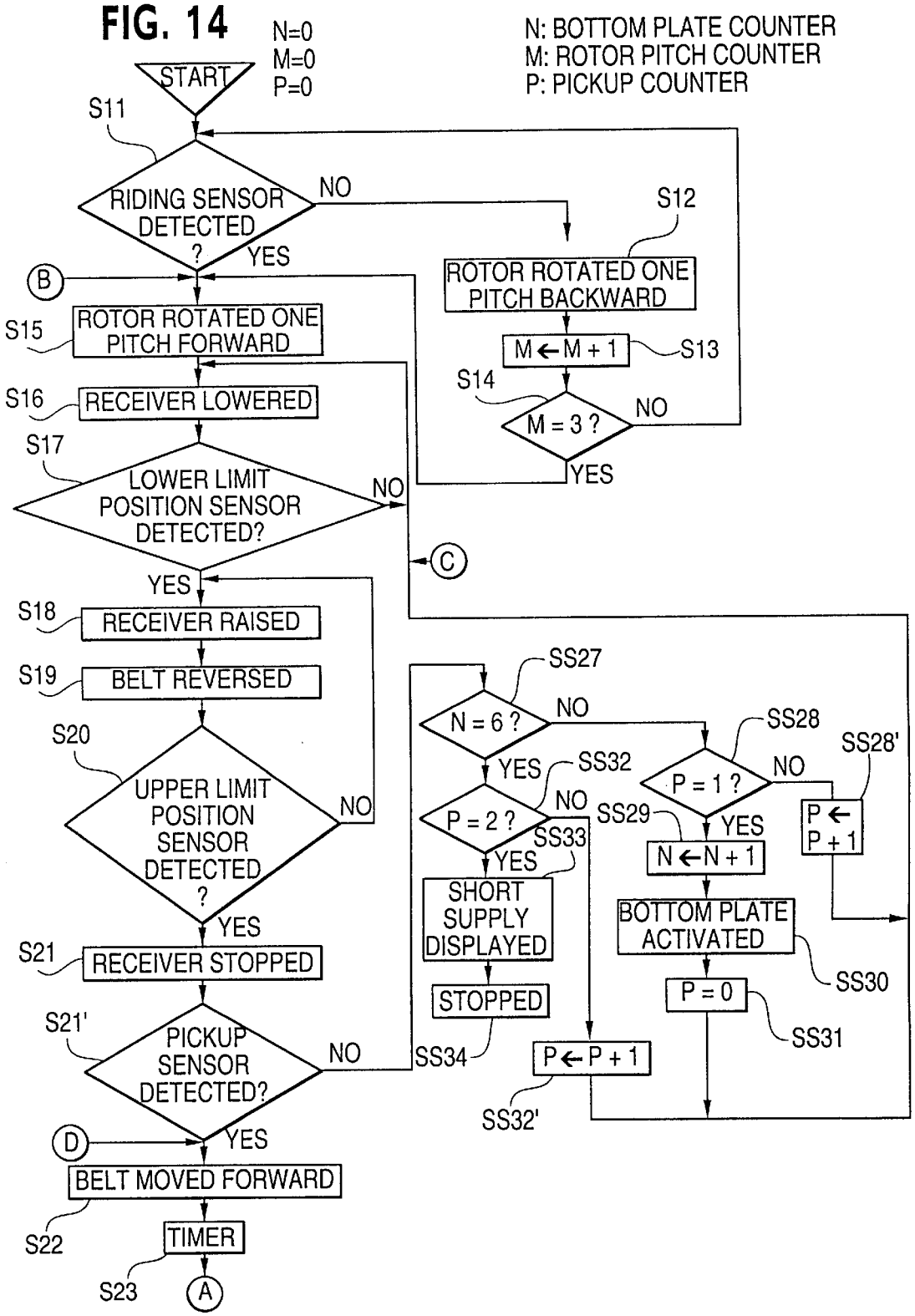
FIGS. 14 and 15 are flowcharts showing operation of an ampule feeder of the third embodiment.
Figure 15:
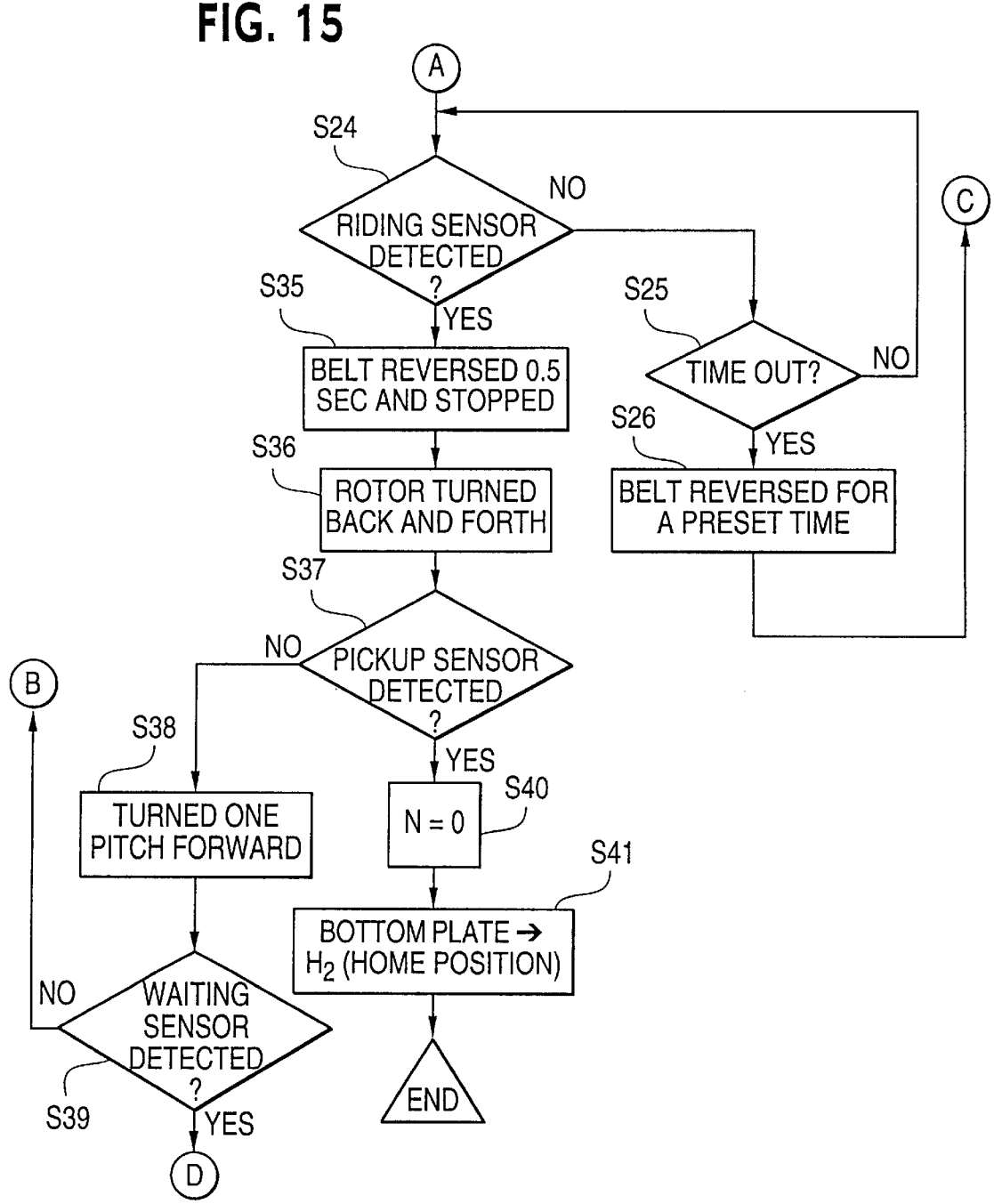

FIGS. 14 and 15 show a flow chart which is a control program of a third embodiment, which is a partial modification of the second embodiment. As will be readily apparent when compared with FIGS. 12 and 13, this flow chart has extra steps S39 for the actuation of one-pitch forward rotation and S39 for pickup sensor detection. Also, the step positions shown by the letters B and D to which the program returns according to the judgment result are changed as shown.

When the flow returns to the step before S16 by B, descent of the pickup starts immediately. If there still remain ampules on the pickup after ampules have been fed into the rotor 41 by the previous action due to the pickup sensor detection in S39, the next ampules can be immediately fed into the rotor 41 by returning the flow to the step before S22 by the letter D and moving the belt forward in S22. Thus, the device operates more efficiently and speedily than in the second embodiment.

Figure 16:
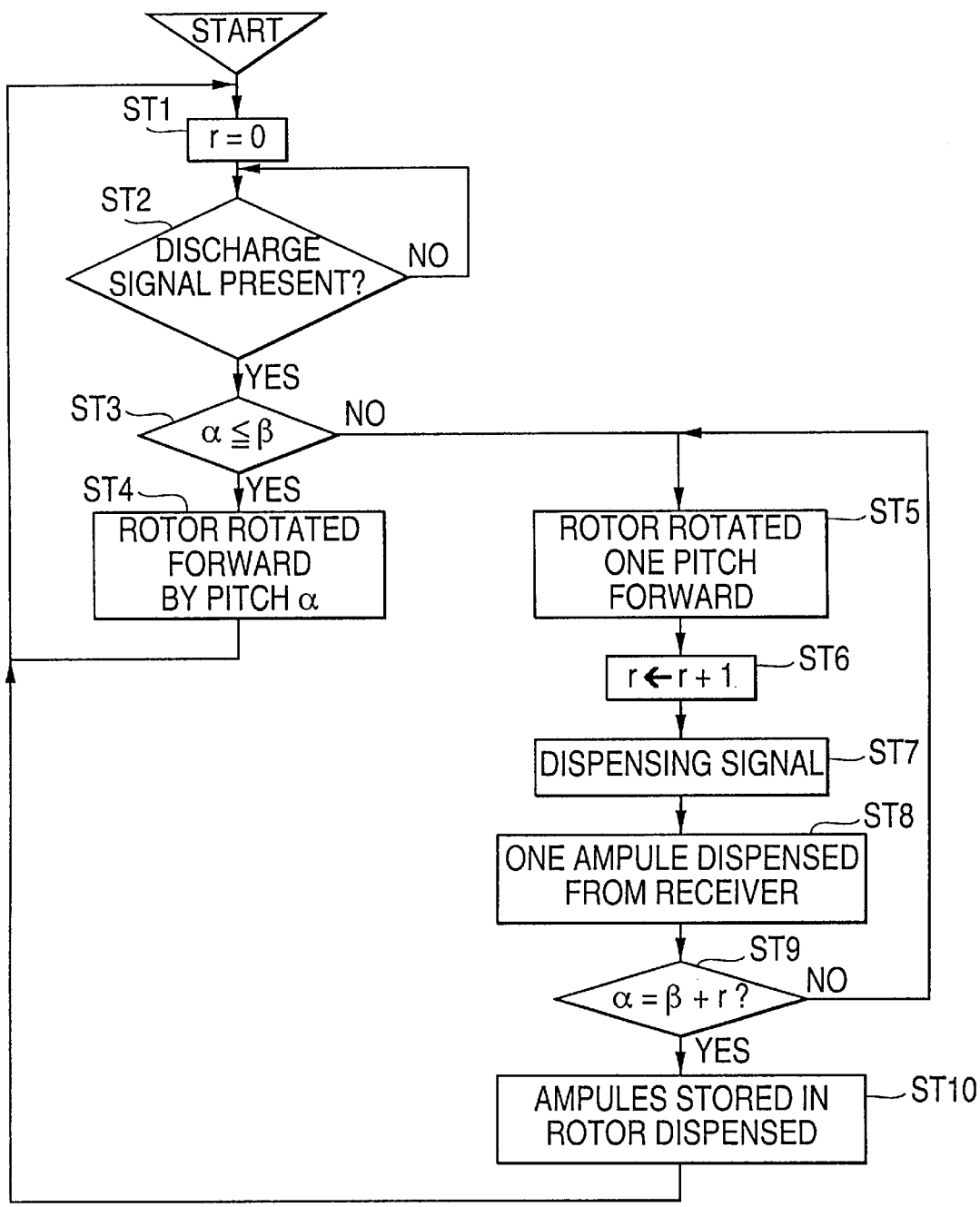
FIGS. 16 and 17 are flowcharts showing a discharge operation of the ampule feeder of the fourth embodiment.
Figure 17:
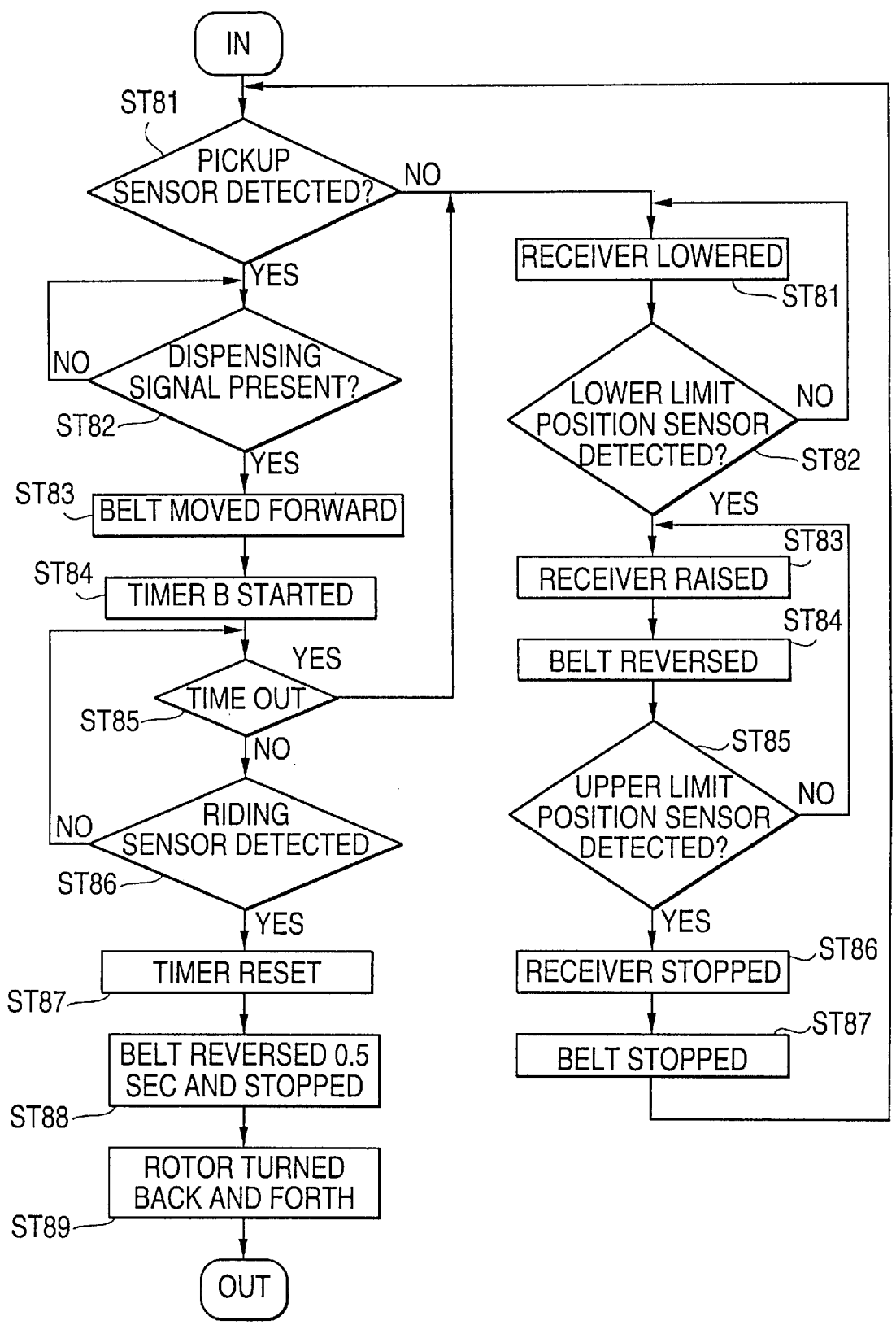

FIGS. 16 and 17 show a control program of a fourth embodiment, which makes it possible to discharge ampules efficiently and quickly from an ampule feeder in which preparation for standby has been completed in response to a command to discharge ampules. In discharging ampules in response to a command to discharge ampules, if the number of ampules designated by such a command is equal to or smaller than the maximum number (3 in the example shown) of ampules that can be stored in the discharge means 40, ampules are discharged in the same manner as in the first to third embodiments. If there is a command to discharge ampules by a number greater than the maximum storable number, ampules are discharged in a different manner by the program shown below.

In the first to third embodiments, though not described clearly, if there is a command to discharge ampules by a number greater than the maximum storable number, all the ampules stored in the discharge means 40 are discharged first. When the discharge means 40 becomes empty, standby preparation procedures are started automatically to resupply ampules into the discharge means 40. When the number of ampules stored reaches the maximum storable number, ampules are discharged by the number equal to the number of ampules to be discharged minus the number of ampules already discharged to discharge ampules by the number to be discharged.

In this method, when ampules are resupplied, ampules are put on the ampule receiver 2 by lowering and raising the ampule receiver 2 in spite of the fact that ampules are on the receiver 2. This is of course a waste of time. In the third embodiment, for efficient and high-speed operation with no waste of time, the following arrangement is employed. In the following description, although no block view is shown as in the first embodiment, an ampule discharge counter used is provided in a software program in a hardware member or the control unit 100.

In the discharge control flow shown in FIG. 16, at the start of operation, the ampule discharge counter $\gamma$ is cleared and set at zero in Step ST1, provided preparation for standby in the second embodiment has been completed in this control flow. Thus, explanation is made as an action after the preparation for standby has been completed in Step S37 for standby sensor detection shown in FIG. 13.

Next, after confirming existence or nonexistence of a discharge signal in ST2, the number $\alpha$ of ampules to be discharged is compared with the number $\beta$ of ampules stored in the rotor 41 of the discharge means 40. As long as $\alpha \leq \beta$ the rotor 41 is continuously rotated in a normal direction in ST4 to discharge ampules by the number a as in the first embodiment. But if not $\alpha \leq \beta$, i.e. $\alpha > \beta$, ampules are resupplied in ST5 and the following steps. For example, if $\beta=3$ for $\alpha=5$, then $\alpha>3$. In such a case, ampules are resupplied.

In Step ST5, the rotor is turned one pitch in a normal direction to discharge one ampule. In ST6, the discharge countery is incremented by one. In ST7, at the end of the increment, a pickup dispensing signal is produced. In ST8, ampules are dispensed from the ampule receiver 2. The operation in ST8 is shown in detail in FIG. 17.

In Step ST81, detection is made by a pickup sensor Ps. During this detection, if ampules remain on the ampule receiver during preparation for standby, detection by the pickup sensor Ps becomes YES immediately. Then after confirming existence or nonexistence of a pickup dispensing signal in ST82, the belt of the ampule receiver 2 is turned in the normal direction to feed ampules into the rotor 41 in ST83. In ST84, a bridge timer is started immediately after the belt is turned in the normal direction. This is because ampules may get stuck like a bridge while ampules are being fed into the rotor 41.

The timer time due to the ampule bridge is a long time, e.g. 1.5 seconds. Thus, without time-out in ST85, the boarding sensor PR checks if ampules are on board the rotor 41 in ST86. If they are, the timer is reset in ST87, the belt is reversed for 0.5 second and stopped in ST88, and the rotor is vibrated in ST89 by being moved forward and backward. In this way, if ampules remain on the ampule receiver 2, ampules are resupplied by moving the belt forward if there is no bridge.

Upon completion of Step ST8, $\alpha$ and $\beta+\gamma$ are compared in ST9. If $\alpha=5$ and $\beta=3$, then $\alpha(=5)>\beta+\gamma=3+1=4$ even if $\gamma=1$ is set in ST6. The answer is thus No and the rotor 41 is turned another pitch in ST5. In ST6, y=2 is met. In ST8, this is repeated. When the ampules are fed into the rotor 41 from the ampule receiver 2, a and $\beta+\gamma$ are compared again in ST9.

This time, the comparison in ST9 will be YES because $\gamma=1$ and $\alpha(=5)>\beta+\gamma=(3+2)$. Thus, all the ampules stored in the rotor are discharged in ST10. The number of ampules discharged by rotating the rotor forward twice in ST5, and the three ampules stored in the rotor are discharged in ST10, an intended number ($\alpha$) ampules are discharged.

The above is the description about the case in which ampules are discharged efficiently and quickly taking advantage of the fact that in many cases, a plurality of ampules remain on the ampule receiver 2 at the completion of preparation for standby. Either of Steps ST81 and ST85 may be in a different state from above.

If, during detection by the pickup sensor Ps in ST81, there is no ampule on the ampule receiver 2, or if ampules on the ampule receiver 2 get stuck like a bridge in ST85, ampules will not move into the rotor 41 within a time period set by the bridge timer. In this case, as shown in FIG. 17, the ampule receiver 2 is moved up and down in Steps ST81'–ST87' to put ampules on the ampule receiver or break the bridge.

Description of ST81'–ST87' is omitted because what is done in these steps are exactly the same as what is done in S16–S21, except ST87', which is added to keep the belt at a stop during ampule detection by the pickup sensor Ps in ST81.

As will be apparent from the above description, in the fourth embodiment, if a command to discharge ampules by a number greater than the number of ampules stored is received, if ampules are on the ampule receiver while ampules are being discharged from the discharge means, any ampules that are short can be immediately fed into the discharge means and discharged by the detection signal of the pickup sensor. Thus, ampules can be discharged and resupplied efficiently and quickly.

Figure 18:
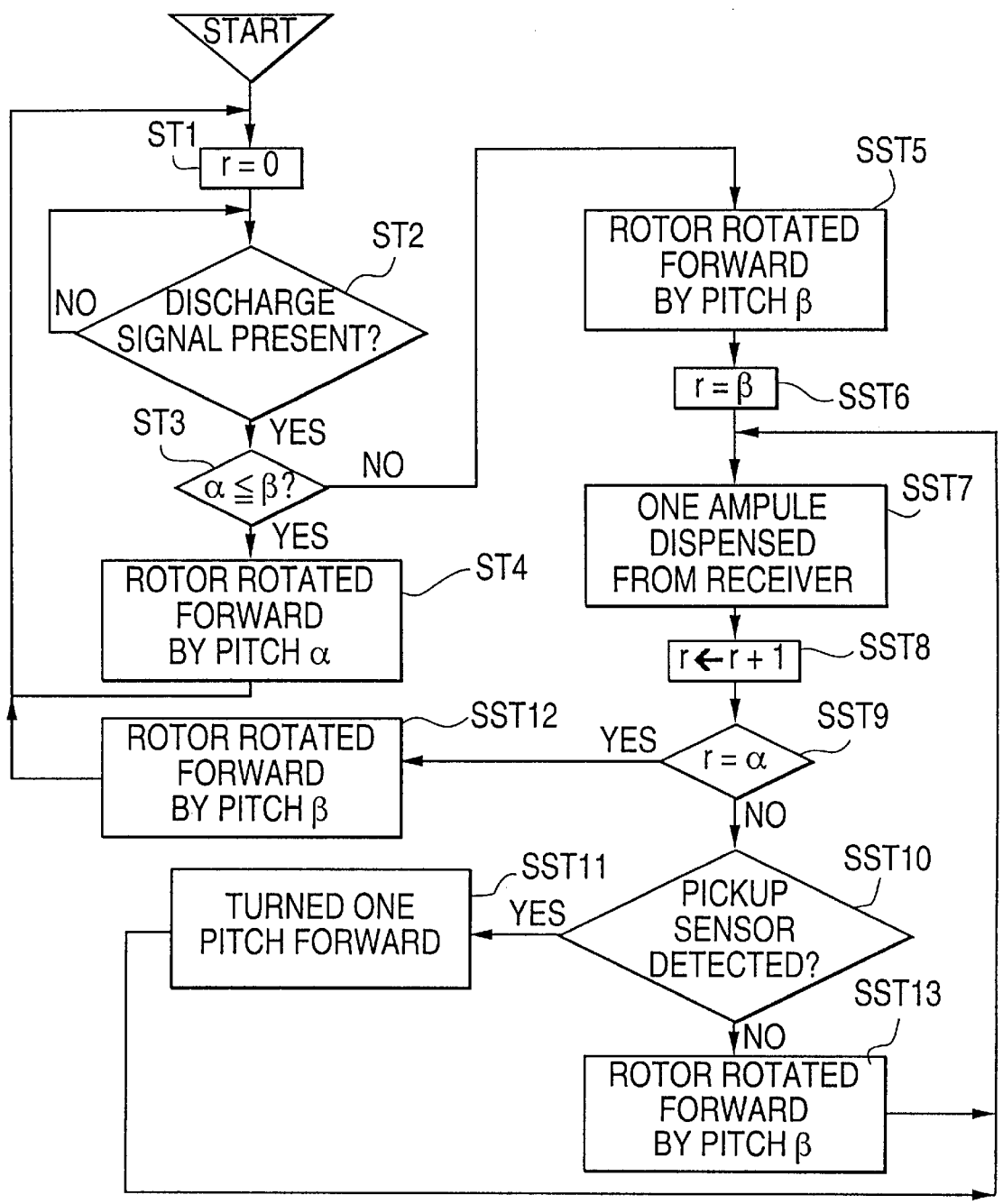
FIG. 18 is a flowchart showing discharge operation of an ampule feeder of the fifth embodiment.

FIG. 18 shows a control program of the fifth embodiment. This fifth embodiment also aims, like the fourth embodiment, to feed ampules into the rotor 41 and discharge ampules efficiently and quickly, taking advantage of the fact ampules remain on the ampule receiver 2. Steps ST1–ST4 in the figure are the same as those in FIG. 16. But if the judgment in ST3 is NO, the following steps are different from those of FIG. 16. Thus, Step SST5 and the following steps are described. It is assumed that preparation for standby has been completed as in the third embodiment.

If the judgment in ST3 is NO, that is, if the number $\alpha$ of ampules to be discharged is greater than the number $\beta$ of ampules stored in the rotor 41, the rotor is turned forward by $\beta$ pitch in SST5 to discharge all the ampules (three ampules in this example) stored in the rotor 41. In SST6, the value $\beta$ (=3) is set in the ampule discharge counter $\gamma$.

Next, in SST7, one ampule is dispensed from the pickup. This dispensing operation is the operation shown in FIG. 17 of the third embodiment. The same operation is applied in this embodiment as it is. When the dispensing action is started and one ampule is fed into the rotor 41 from the pickup by the detection of the boarding sensor PR, the value of $\gamma$ is incremented by one in SST8. In SST9, this value $\gamma$ (=4) is compared with the number $\alpha$ of ampules to be discharged to check if they are equal to each other.

Initially, $\gamma$ is 4. If the number $\alpha$ of ampules to be discharged is 5, $\gamma$ is smaller than $\alpha$ ($\gamma \neq \alpha$). Thus, judgment is NO. In SST10, the pickup sensor Ps checks if ampules are on the pickup. If ampules are on the pickup, the rotor 41 is turned one pitch forward in SST11, and in SST7, ampules on the pickup are fed into the rotor 41 again. In SST8, the $\gamma$ is incremented by one. Since $\gamma=5$ this time, $\gamma=\alpha$. Thus, the rotor 41 is turned forward in SST12 by pitch $\beta$ to discharge ampules in the rotor 41. All the ampules have now been discharged.

This is the arrangement in which ampules are discharged efficiently and quickly by immediately feeding any number (e.g. 2 or 3) of ampules on the pickup into the rotor 41. In the above operation, if all the ampules on the pickup have been fed into the rotor 41, the detection result by the pickup sensor Ps in SST10 will be NO. In such a case, the rotor 41 is turned forward by pitch β in SST13 to return to the step before SST9 to discharge all the ampules in the rotor 41 even though the number of ampules discharged is still short of the number α of ampules to be discharged.

In SST7, the dispensing operation shown in FIG. 17 is repeated. In this case, since the fact that ampules are on the pickup has been detected in SST10, no ampule is detected in the detection by the pickup sensor Ps in ST81. Thus, the pickup is moved up and down in ST81' and the following steps. When ampules are detected, operations in SST8 and the following steps are carried out.

In the above description, it was assumed that a plurality of ampules are on the pickup. If there is no ampule on the pickup, the step of moving up and down the pickup is immediately carried out in SST7 to put ampules onto the pickup.

Figure 19:
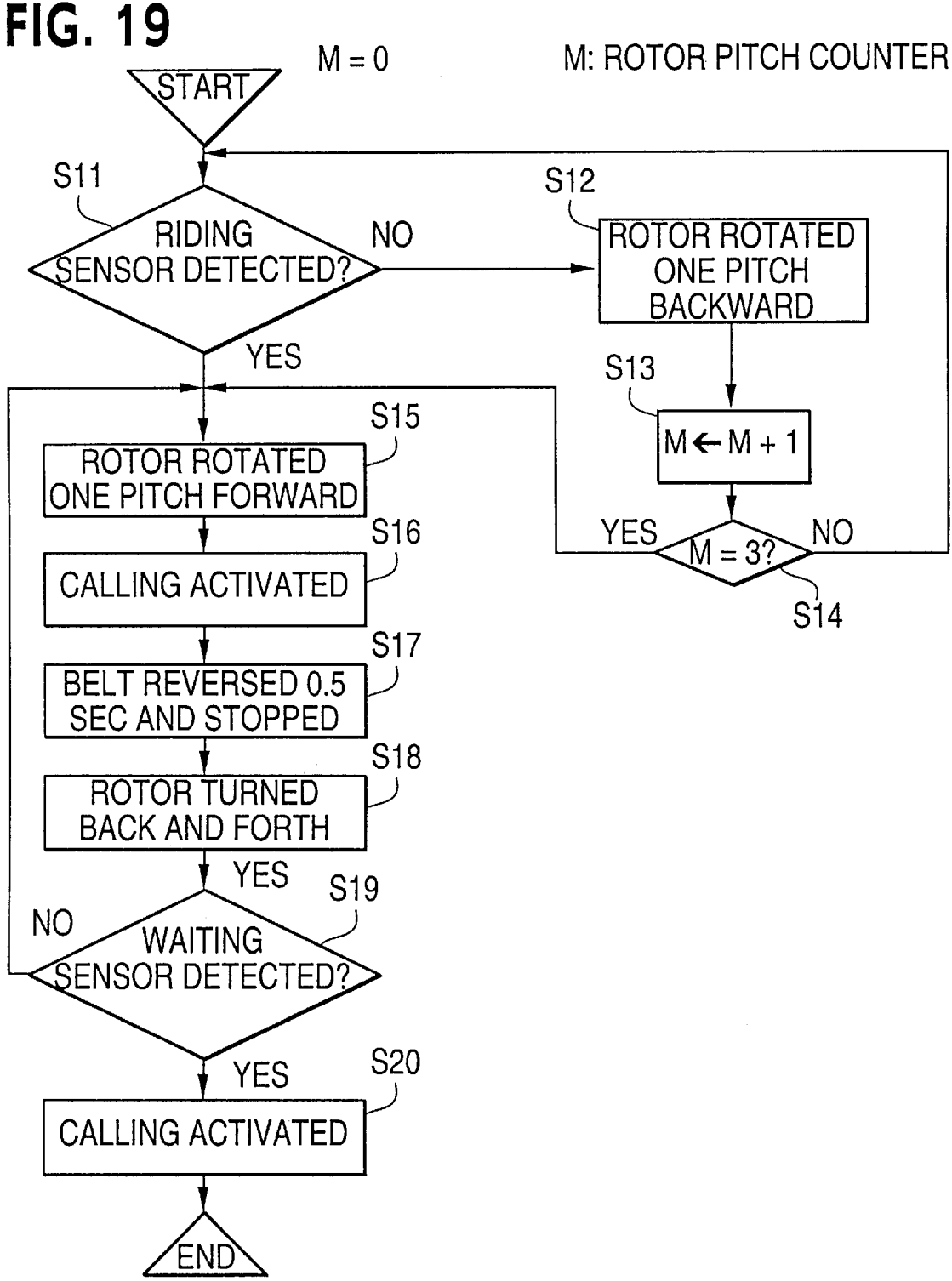
FIGS. 19 and 20 are flowcharts showing operation of an ampule feeder of the sixth embodiment.
Figure 20:
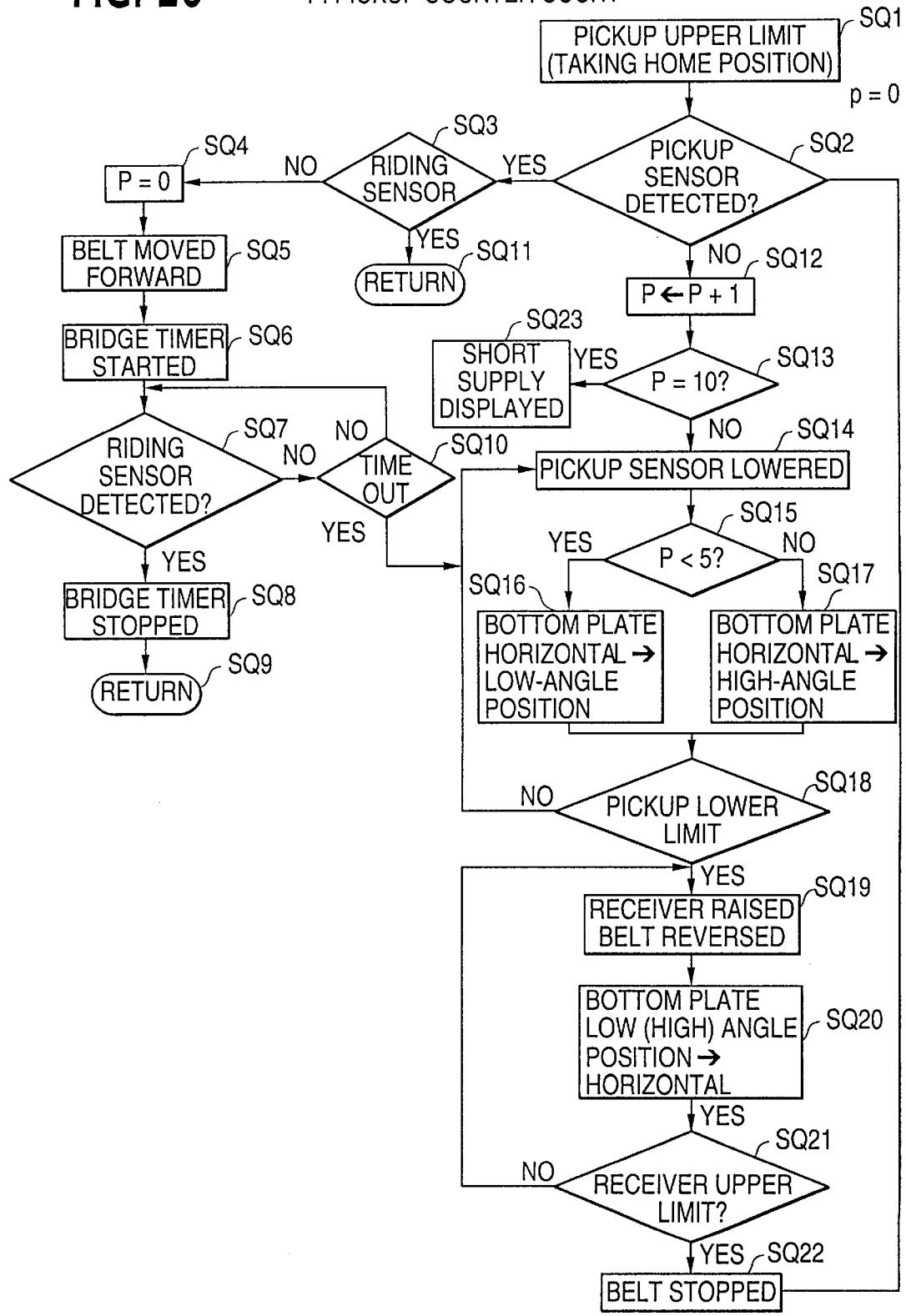

FIGS. 19 and 20 show flowcharts of a control program of a sixth embodiment. In this embodiment, the operation of the rotor is the main program (FIG. 19), and the operation of the pickup is provided as a separate subprogram. This embodiment vastly differs from the other embodiment in that instead of associating the lowering of the pickup with the inclination of the bottom plate and adjusting the operating angle of the bottom plate based on the amount of ampules in the ampule container, the bottom plate is moved based on the number of times the pickup swings and misses when it is raised and lowered.

And this control program improves the ampule boarding rate on the pickup and increases the standby preparation speed by operatively associating the pickup with the bottom plate and by controlling the up-and-down movement of the pickup.

As shown in FIG. 19, Steps S11–S15 in the main program are exactly the same as some of the first to third embodiments. Thus, they are indicated by the same numerals and not described. By turning the rotor one pitch forward in S15, the rotor 41 at the position of the boarding sensor is in the state in which no ampule is received in its grooves (empty). It stops at this position to wait for ampules to get on board. In SPI6, a calling step is carried out. When the subprogram of FIG. 20 is carried out, this program is processed preferentially.

When the subprogram is activated, the pickup is raised to its upper limit in Step SQ1 (home position taking). This is because there is a case when the pickup is stopped at the lowest level or an intermediate level, so that it has to be moved to the home position.

Next, in SQ2, it is detected whether or not ampules are on the pickup. If ampules are on, checking by the boarding sensor is carried out in SQ3. If no ampule is detected by the boarding sensor, the pickup sensor P is reset in SQ4, and the program proceeds to SQ5. Checking by the boarding sensor is carried out so that, as will be described later, the program can return to SP20 after checking existence or nonexistence of ampules on the pickup by the calling in SP20.

In SQ5, the belt of the pickup is turned forward to feed ampules into the rotor 41, and the bridge timer is started in SQ6. In SQ7, feed of ampules into the rotor 41 is checked by the boarding sensor. When ampules are detected, the timer is reset in SQ8 and the program returns to SP16 of the main program in SQ9. In the feed check, if boarding of ampules is not detected within a predetermined time, this results in time-out in SQ10, and the program proceeds to the flow of lowering the pickup, which will be described later.

When boarding of ampules on the rotor 41 is detected in SQ7 and the program returns to SP16 of the main program, the program proceeds to SP17, where the belt is moved backward for 0.5 second and stopped. In SP18, the rotor is vibrated by being turned back and forth. The meaning of the operations in SP17, SP18 are the same as those in the first to third embodiments.

When it becomes certain that ampules have been on board the rotor 41 by vibration, ampules are checked by the standby sensor in SP19. If, as a result of the check by the standby sensor, not all the ampules have been charged to the position of the standby sensor, the program returns to S15 and repeats the above operation.

In the above description, it has been assumed that ampules are on the pickup from the very moment when the pickup has been moved to the highest position by the subprogram. But this is because, as will be described later, the device of this embodiment is controlled so as to judge that preparation for standby has been finished by putting ampules on the pickup after ampules have been fed into the rotor.

In the initial stage when the pickup has been moved to its upper limit, ampules may not be on the pickup. In this case, judgment in SQ2 is NO. The program thus proceeds to SQ12 to increment the pickup counter P (set at zero when activated) for counting the number of times the pickup swings and misses by one. In SQ13, if P=10 is determined. If P=10, that is, if the pickup fails to catch ampules 10 times or more, the fact that no ampules are in the ampule container is displayed in SQ23, and the operation is stopped.

If the number of times the pickup fails to pick up ampules is 10 or less, the program proceeds to SQ14 to lower the pickup by sending a signal to lower the pickup to the motor. In SQ 15, it is judged whether P is less than 5 or not. If less than 5 in SQ16, the bottom plate is inclined from its horizontal position to a low-angle position.

When activated, the bottom plate is immediately kept horizontal. The low-angle position is the state of H3 in the first to fifth embodiments. If P is 5 or more (10 or less) in the judgment of SQ15, the program proceeds to SQ17, where the bottom plate is inclined from its horizontal position to a high-angle position, which is the state of H4.

After the bottom plate has been inclined in either SQ16 or SQ17, the lowering of the pickup to its lower limit is checked in SQ18. Conversely, in SQ19, the pickup is raised and the belt is moved backward. And simultaneously when the pickup is raised, the bottom plate is swung back to its horizontal state from the low-angle position or high-angle position.

While the pickup is rising toward its upper limit in SQ21, the belt is stopped in SQ22 and the program returns to the step before SQ2 to detect if ampules are on the pickup. If no ampules are picked up on the pickup with the one-time up-and-down movement of the pickup, ampules are picked up onto the pickup by repeating the operations of SQ12 and the following steps.

In this way, even if ampules are initially not on the pickup, if ampules are picked up onto the pickup by moving the pickup up and down, the program proceeds to Steps SQ3–SQ9 and returns to SP16 of the main program.

If ampules are detected by the standby sensor as a result of detection by the standby sensor in Step SP19, since the ampules storable in the rotor 41 are all in, the program proceeds to SP20, where the subprogram is called again.

When the subprogram is called, the program again proceeds to through SQ1 to SQ2 to perform detection by the pickup sensor. The step of calling the subprogram is effective in the following case. That is, the standby sensor detects ampules while the program is proceeding to SP19 of the main program, and when the program proceeds to SP20, all the ampules are received in the rotor.

But if the rotor is stopped in the standby position with no ampules remaining on the pickup when the program proceeds to this step, in order to prevent a delay in resupplying ampules after ampules have been discharged on command to discharge ampules from the rotor, the pickup is kept at the standby position with ampules put thereon by lowering and raising the pickup in SQ12 and the following steps.

When ampules are picked up on the pickup, based on the judgment result in SQ2, the program proceeds to SQ3. In this case, the boarding sensor of course detects ampules, so that the program proceeds to SQ11 and returns to the main program. The return to the main program is, in this case, the return to SP20, where the operation stops in the standby state.

Thus, with the program of this embodiment, since the pickup is always kept in the standby position with ampules thereon, the operation of resupplying ampules into the rotor after ampules have been discharged from the rotor can be carried out quickly and speedily.

When the pickup is lowered, the bottom plate is inclined, and when the former is raised, the latter is moved back to its horizontal state. Thus, the bottom plate is inclined when the pickup is at its lower limit, so that the boarding rate of ampules on the pickup increases dramatically. By pivoting the bottom plate, ampules in the ampule container are stirred. This prevents bridging.

Further, in this embodiment, unlike the first to fifth embodiments, when the bottom plate is inclined in the ampule container, the inclination angle of the bottom plate to the high-angle position or low-angle position is determined based on the number of times the pickup fails to pick up ampules, as counted by the pickup counter. This further improves the boarding rate of ampules on the pickup.

Referring to FIG. 16, description is now made of a fourth embodiment, which includes a special control flow for improving the detection accuracy of the sensors SR and the standby sensor SW for the rotor 41 used in each of the above embodiments. This flow is also processed by a separate program stored in the control unit 100 shown in FIG. 7. An input signal from a sensor reset switch is entered into the control unit 100. Upon receiving this input signal, the control unit 100 enters the following two sensor behavior adjusting modes while interrupting other control modes.

In the following description, regardless of which of the first to third embodiments is used, it is assumed that ampules have been received in the discharge means 40 and the preparation step has been completed. The preparation step does not necessarily have to be set automatically. Since it is possible to perform a checking step provided there are ampules at the respective positions of the sensor PR and the standby sensor PW, ampules may be manually inserted into the sensor positions and the following steps may be started.

When a sensor reset switch signal is entered in Step SA1, the voltage is detected by the sensor PR and the standby sensor PW with ampules received at the respective positions and stored in a memory in SA2. When the rotor 41 is turned one pitch in Step SA3, the position of the sensor PR becomes an empty state in which no ampule is present. Thus, with the sensor PR empty, the voltage is stored in SA4. Next, the rotor is turned one pitch backward in SA5 to return the groove from which an ampule has been discharged to the position of the standby sensor. In this state, the voltage when the standby sensor PW is empty is stored in SA6.

Either of the sensor PR or standby sensor PW determines that there is an ampule if one of the two light-receiving elements confirm the existence of an ampule. Presence of an ampule is confirmed by voltage variations corresponding to the condition of light received by the light-receiving elements PRa, PWa. But actually, due to mounting accuracy of these sensors, accuracy of sensor parts, and temperature variations, there may be a slight misalignment in optical axis between the light-emitting elements PR and PW and the light-receiving elements PRa and PWa. Thus, there is a slight difference between voltages when ampules are detected by the individual sensors.

For example, while the average voltages measured by the individual sensors when ampules are detected and not detected in each embodiment is 5 V and 0 V, respectively, the voltages measured by some sensor when ampules are detected and not detected may be 4 V and 3.8 V, respectively. In order to treat the ampule detecting operation by these sensors as being correct, it may be determined that correct ampule detection has been done if the voltage is 4 V or higher by setting an absolute reference voltage.

But if such an absolute reference voltage is used as a reference for ampule detection, it is necessary to correct e.g. the sensor mounting accuracy so that the voltage may not drop below the absolute reference voltage during ampule detection due e.g. to sensor mounting accuracy. It thus takes a long time and a lot of trouble to mount the sensors and adjust the voltage. Thus, in this embodiment, different thresholds are set for the individual sensors as their detected voltages by using values when an ampule exists and does not exist so that the existence and nonexistence of ampules can be detected reliably without the need for mounting adjustment for individual sensors.

In SA7, as a threshold for ampule detection voltage, a threshold is calculated as follows:

(voltage when ampules are detected+voltage when ampules are not detected)/2=threshold By setting the threshold, this threshold is used to check the voltage during ampule detection. If this threshold is exceeded, it is determined that there is an ampule. For example, if the voltage during ampule detection is 4 V or 3.8 v and the voltage when empty is 0, their respective thresholds will be 2 V or 1.9 V. By using these thresholds, it is possible to accurately detect the existence of ampules in the above two cases.

When individual thresholds are set in SA7, the rotor 41 is turned one pitch forward in SA8 to return to the beginning and wait. The thresholds set for the respective sensors in the above manner are stored in the control unit 100. During ampule detection, the detection signal is compared with these thresholds to check the detection of ampules.

In the fourth embodiment, the detection operations of the ampule detecting sensors provided in the discharge means are checked by reference values or thresholds set for individual sensors in the control unit for empty and detected states. Thus, accurate ampule detection results are obtainable without the need for mounting adjustment of each sensor.

As described above in detail, the ampule feeder of this invention has a random storage type ampule container, an ampule receiver and a dispenser. Ampules dispensed by the dispenser in cooperation with the discharge means connected to the dispenser are received in the grooves formed in the rotor and discharged based on discharge signals. It is thus possible to store a predetermined number of ampules in the discharge means by dispensing ampules stored randomly in the container one by one and instantly discharge a predetermined number of ampules in response to a discharge signal. Ampules can thus be supplied efficiently and speedily.

What is claimed is:

1. An ampule feeder comprising an ampule container in which are randomly stored many ampules, an ampule receiver provided on one side of said ampule container and movable up and down with the ampules received orderly from said ampule receiver, a dispenser means for dispensing the ampules on said ampule receiver out of said ampule container one at a time, a discharge means for storing the dispensed means ampules and discharging them one by one, and a control unit for detecting the existence of the ampules dispensed from said dispenser and for controlling said ampule receiver and said dispenser means in cooperation with said discharge means such that if no ampules are detected in said discharge means, a required number of ampules are stored.

2. An ampule feeder as claimed in claim 1 wherein said ampule container has a bottom plate inclinable in at least one direction.

3. An ampule feeder as claimed in claim 2 wherein said discharge means comprises a rotor having grooves in which ampules can be stored.

4. An ampule feeder as claimed in claim 3 wherein said control unit detects the state of storage of ampules in said rotor by means of a standby sensor, and controls said rotor so that if the number of ampules in said rotor is not more than a predetermined number, said rotor is rotated backward to bring an empty one of said grooves to an ampule receiving position and said rotor is rotated forward at the ampule receiving position to receive a predetermined number of ampules.

5. An ampule feeder as claimed in claim 3 wherein said control unit has a second sensor which detects that ampules have been received in said rotor, and if no ampules are received in said rotor even after the raising and lowering of said ampule receiver and the dispensing by said dispenser means have been repeated a predetermined times, said control unit adjusts the angle of said bottom plate in association with said discharge means.

6. An ampule feeder as claimed in claim 4 wherein said dispenser means has an endless belt, and wherein if no ampules are received in said rotor, said control unit lowers said ampule receiver, and moves said endless belt of said dispenser means in a reverse direction when said ampule receiver is raised from its lower limit to eliminate any ampules piled one on another.

7. An ampule feeder as claimed in claim 4 herein said standby sensor or said second sensor comprises a light-emitting element and a plurality of light-receiving elements, and is adapted to output a detection signal if one of said light-receiving elements detects an ampule.

8. An ampule feeder as claimed in claim 2 wherein said ampule receiver has a pickup sensor for detecting the existence of ampules, and wherein if no ampules are supplied from said dispenser means into said discharge means during the detection of existence of ampules, said control unit activates said dispenser means in response to a detection signal from said pickup sensor so that a required number of ampules are stored in said discharge means.

9. An ampule feeder as claimed in claim 2 wherein said ampule receiver has a pickup sensor for detecting the existence of ampules, and wherein if there is a command to discharge ampules that are greater in number than the number of the ampules stored in said discharge means, said control unit activates said dispenser means in response to a detection signal from said pickup sensor so that a number of ampules that are short are dispensed into said discharge means while discharging the ampules from said discharge means.

10. An ampule feeder as claimed in claim 7 wherein said control unit is connected to receive a signal from a sensor reset switch, and wherein thresholds for detecting whether or not the detection of ampules by said standby sensor and said second sensor is accurately performed are set for each sensor by performing a predetermined calculation based on the state in which ampules are detected and the state in which ampules are not detected.

11. An ampule feeder as claimed in claim 5 wherein said standby sensor or said second sensor comprises a light-emitting element and a plurality of light-receiving elements, and is adapted to output a detection signal if one of said light-receiving elements detects an ampule.

* * * * *